US012624778B1

(12) United States Patent
Reick

(10) Patent No.: US 12,624,778 B1
(45) Date of Patent: May 12, 2026

(54) POLYURETHANE PIPE THREAD TAPE ASSEMBLY

(71) Applicant: Fluoramics Inc., Lewiston, MN (US)

(72) Inventor: Gregg Gerald Reick, Minnesota City, MN (US)

(73) Assignee: Fluoramics Inc., Lewiston, MN (US)

( * ) Notice: Subject to any disclaimer, the term of this patent is extended or adjusted under 35 U.S.C. 154(b) by 0 days.

(21) Appl. No.: 19/331,486

(22) Filed: Sep. 17, 2025

(51) Int. Cl.
| *F16L 15/04* | (2006.01) |
| *B65H 35/00* | (2006.01) |
| *C09J 7/25* | (2018.01) |
| *C09J 7/38* | (2018.01) |
| *C09J 7/40* | (2018.01) |

(52) U.S. Cl.
CPC .............. *F16L 15/04* (2013.01); *B65H 35/00* (2013.01); *C09J 7/25* (2018.01); *C09J 7/385* (2018.01); *C09J 7/401* (2018.01); *C09J 7/405* (2018.01); *C09J 2475/006* (2013.01)

(58) Field of Classification Search
CPC ... F16L 15/04; B65H 35/00; C09J 7/25; C09J 7/385; C09J 7/401; C09J 7/405; C09J 2475/006
See application file for complete search history.

(56) References Cited

U.S. PATENT DOCUMENTS

| 3,639,525 A | 2/1972 | Kent |
| 5,096,206 A | 3/1992 | Andre et al. |

| 6,034,002 A | 3/2000 | Maderek |
| 10,889,739 B2 | 1/2021 | Prell et al. |
| 11,732,211 B2 | 8/2023 | Pastorello et al. |
| 12,258,231 B2 | 3/2025 | Eichelmann et al. |
| 2008/0136164 A1 | 6/2008 | Knappmiller |
| 2013/0247344 A1 | 9/2013 | Aycock |
| 2019/0084203 A1 | 3/2019 | Protopapas |
| 2022/0136652 A1* | 5/2022 | Shilling .................... F17C 1/16 |
| | | 220/590 |
| 2025/0145779 A1 | 5/2025 | Kirchner et al. |

FOREIGN PATENT DOCUMENTS

| CN | 119307188 A | 1/2025 |
| DE | 2130166 A1 | 12/1972 |
| WO | 2024160918 A1 | 8/2024 |

* cited by examiner

*Primary Examiner* — George R Koch
*Assistant Examiner* — Christopher C Caillouet
(74) *Attorney, Agent, or Firm* — Fredrikson & Byron, P.A.

(57) ABSTRACT

Some embodiments include a polyurethane pipe thread tape and a pipe thread tape assembly including the pipe thread tape and a paper liner, and in some instances a casting layer. The pipe thread tape can include a polyurethane film and an adhesive. The pipe thread tape can be wrapped around external threads at an end region of a first piping component. The wrapped end region of the first piping component can be attached to an internally threaded end region of the second piping component. The pipe thread tape can be separated from a paper liner by stretching a pipe thread tape assembly lengthwise, the paper liner initially being coupled with the pipe thread tape via the adhesive, and the pipe thread tape having greater stretchiness than the paper liner. The pipe thread tape can be provided in and dispensed from packaging, in some instances.

30 Claims, 15 Drawing Sheets

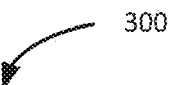
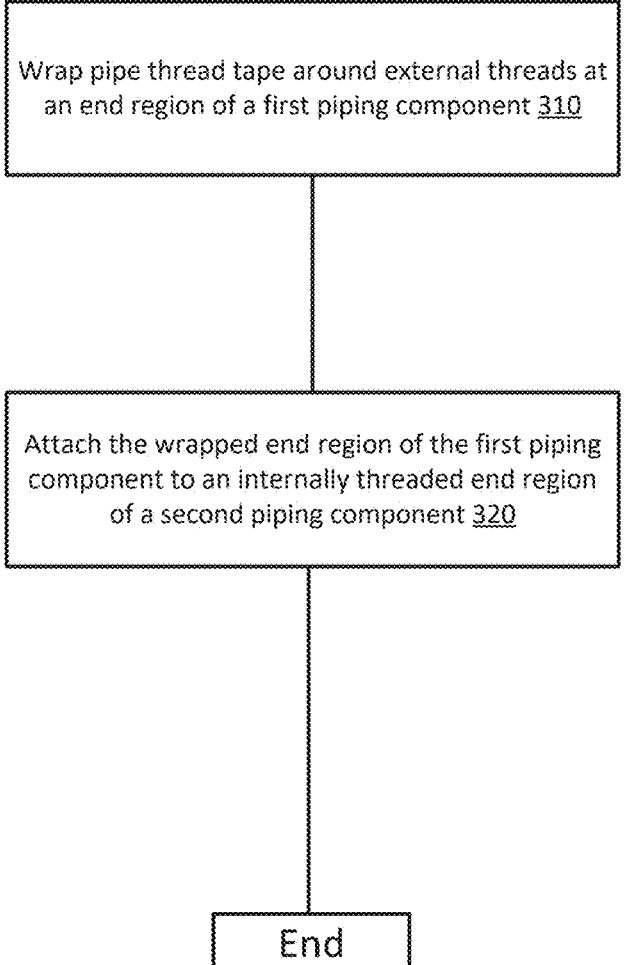
FIG. 3

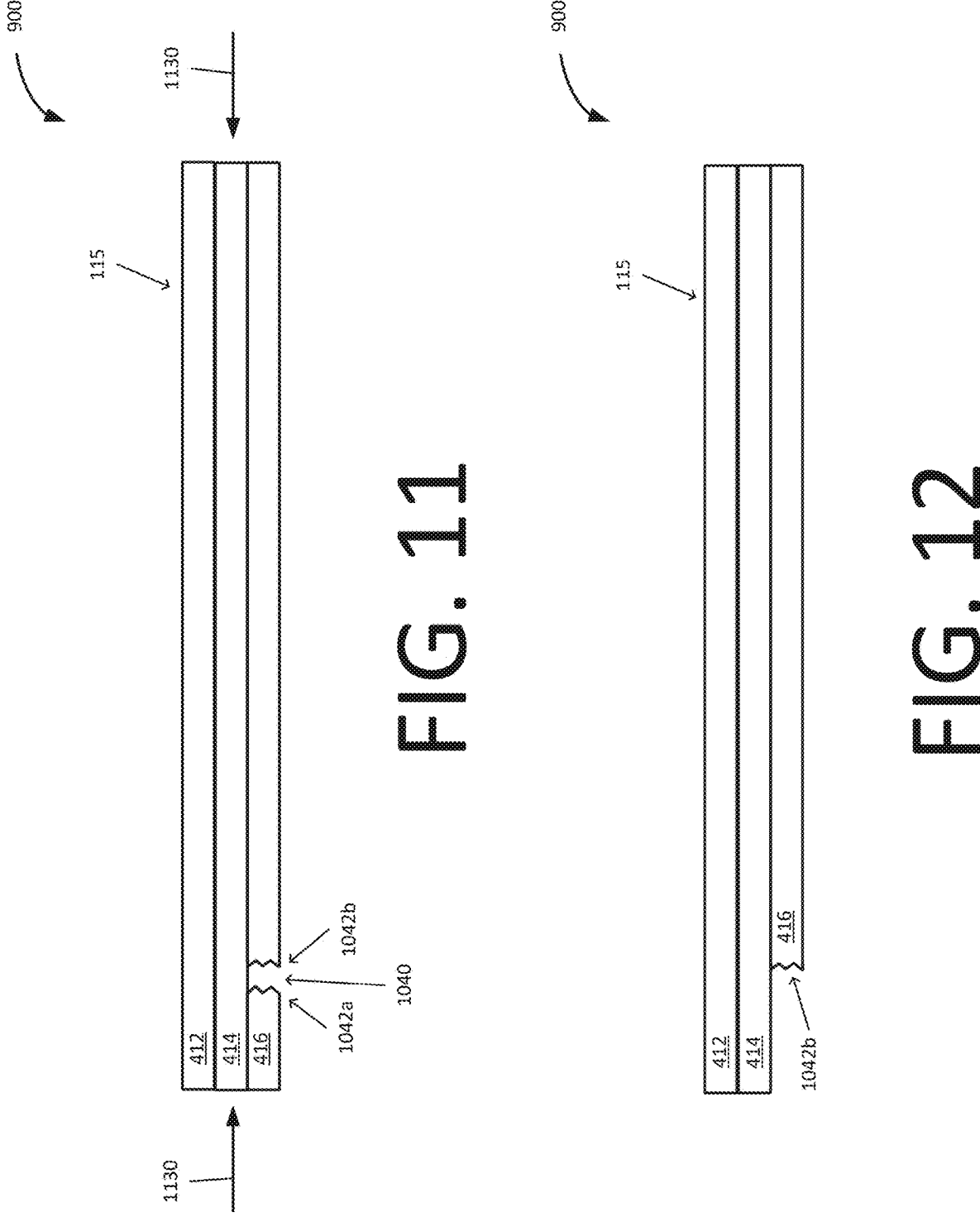

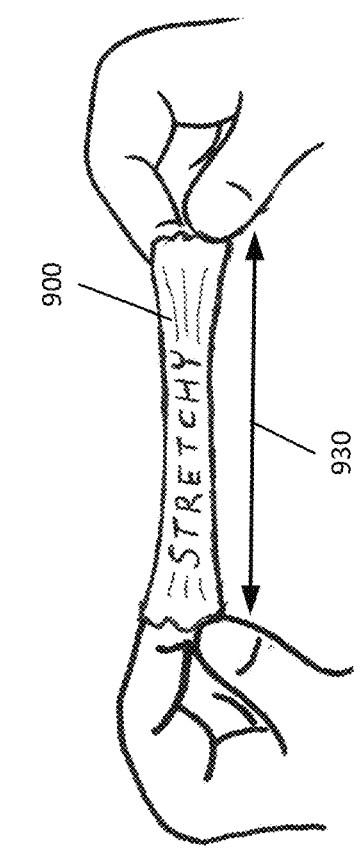
900
930
STRETCHY
FIG. 13B
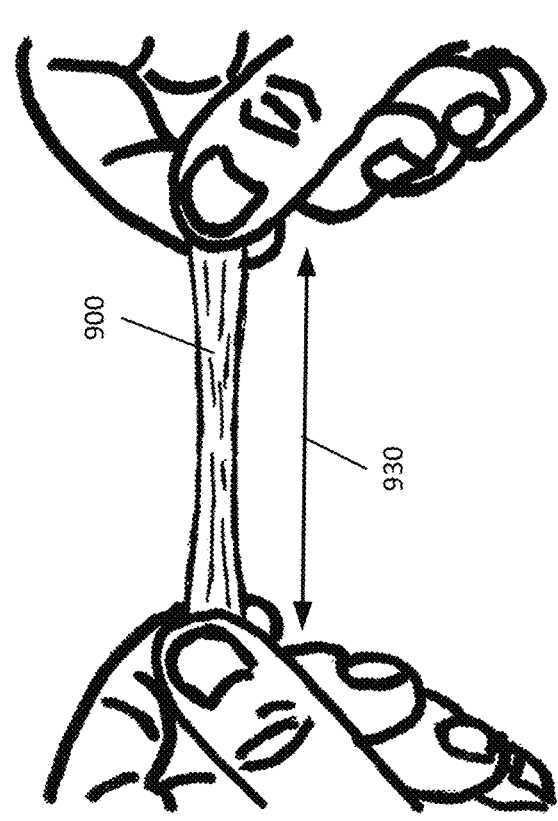
900
930
FIG. 13A

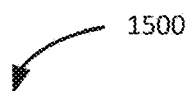
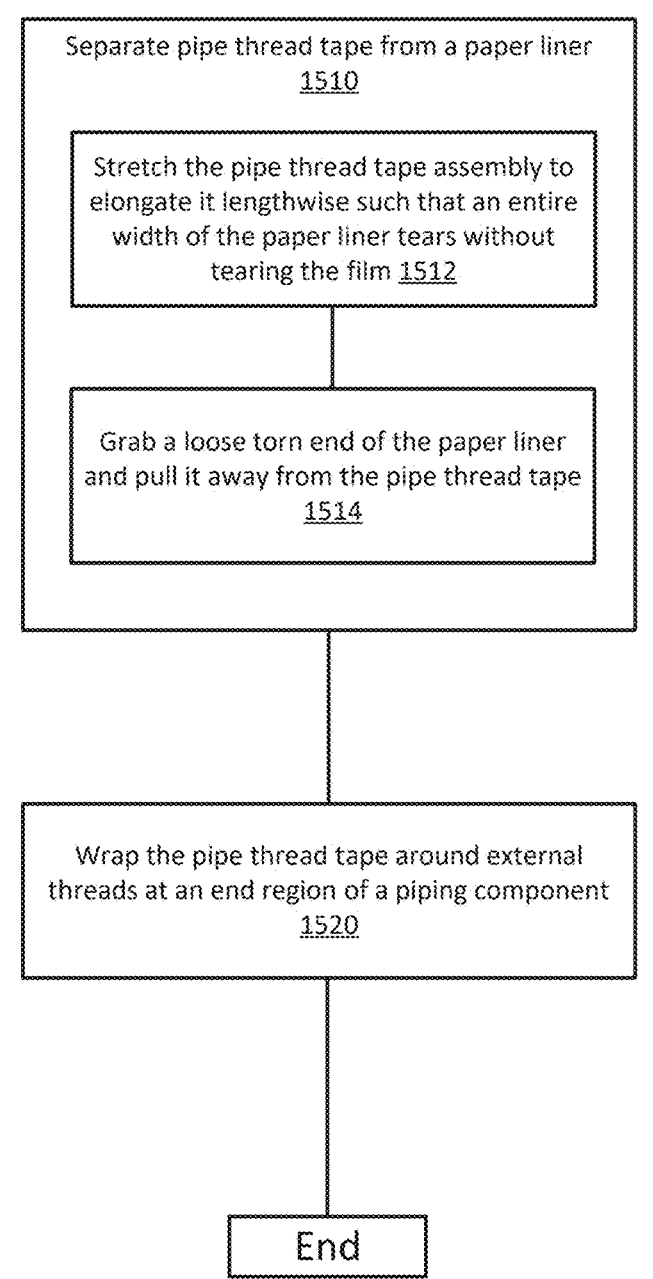
FIG. 15

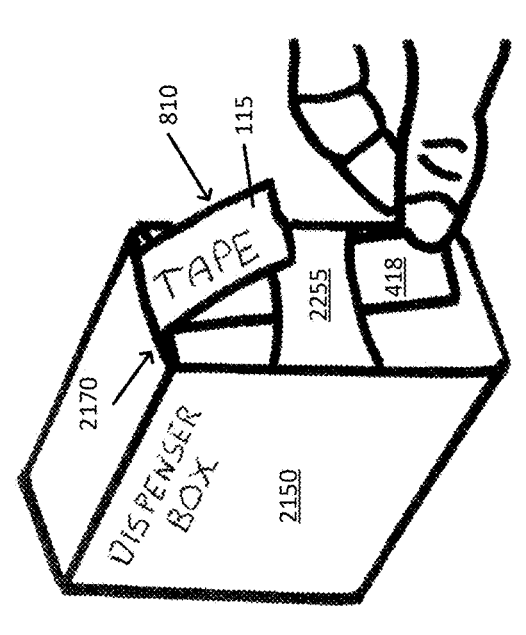
FIG. 22
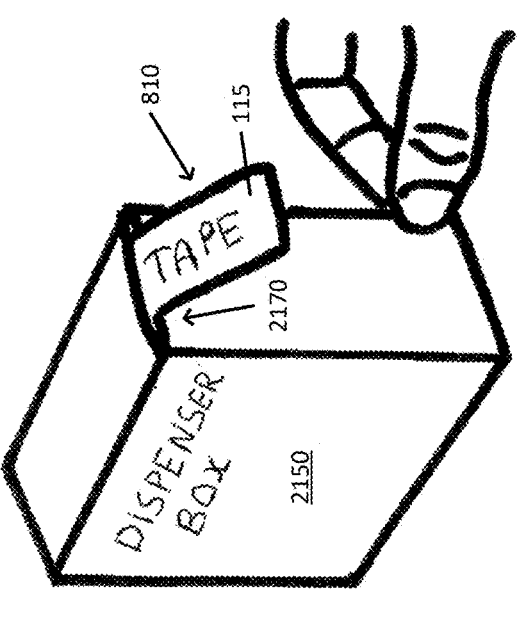
FIG. 21

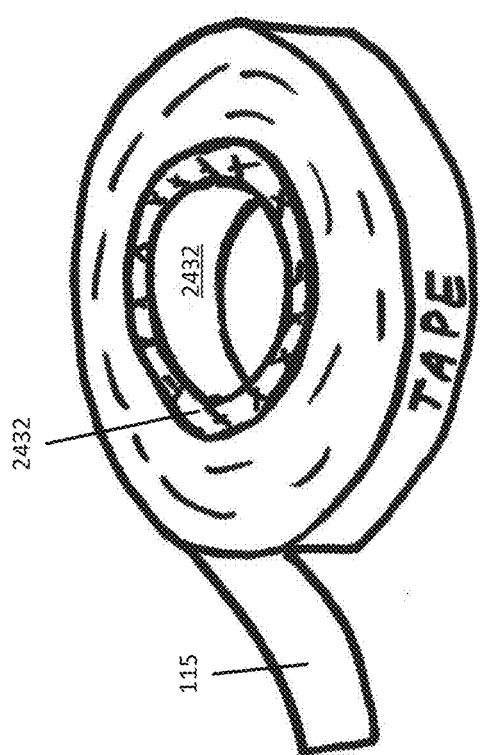
FIG. 24
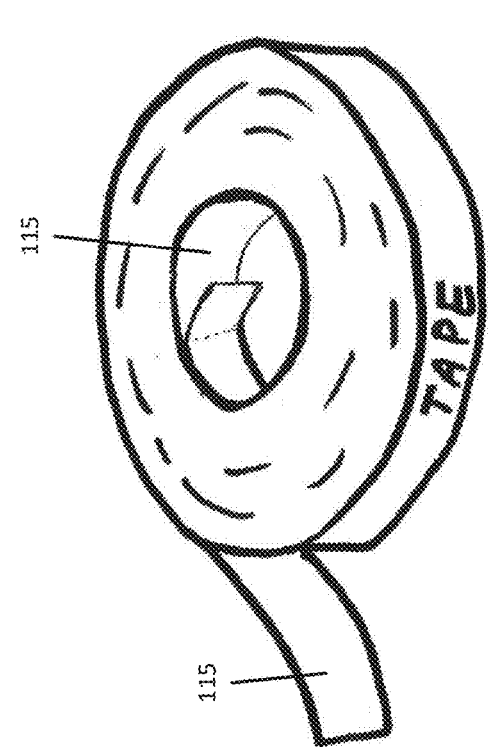
FIG. 23

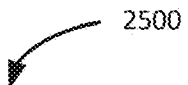
2500
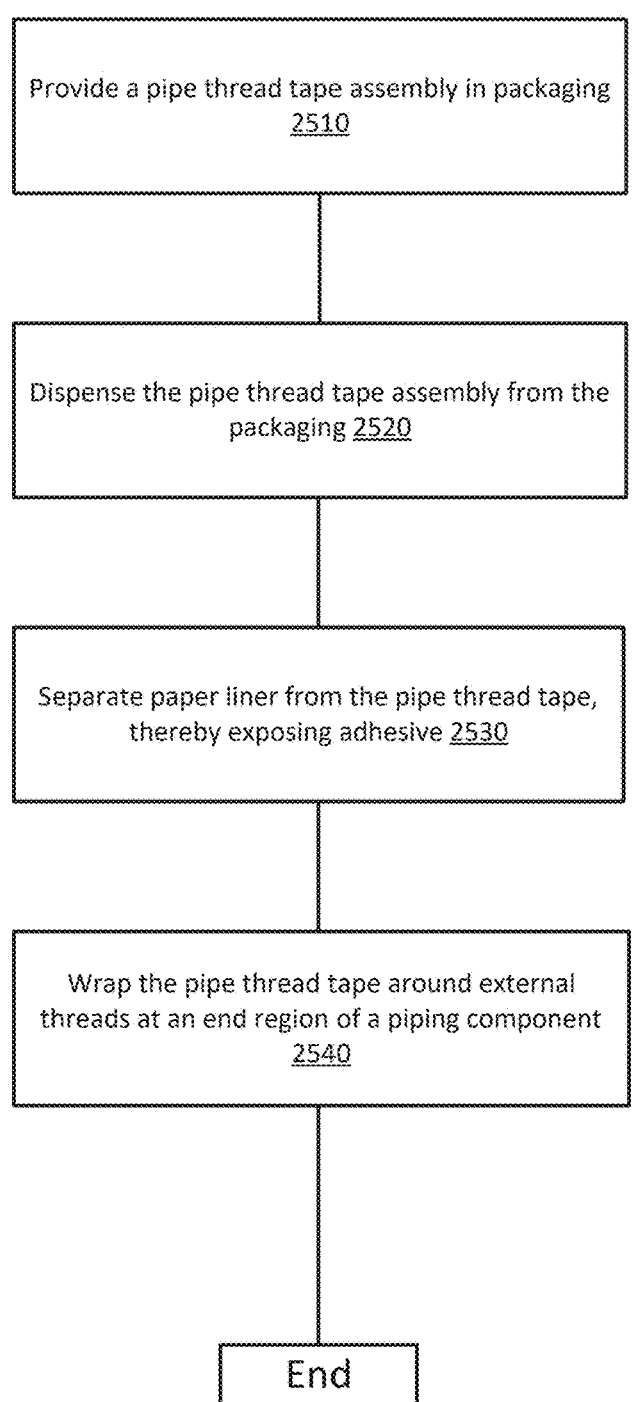
Provide a pipe thread tape assembly in packaging
2510
Dispense the pipe thread tape assembly from the
packaging 2520
Separate paper liner from the pipe thread tape,
thereby exposing adhesive 2530
Wrap the pipe thread tape around external
threads at an end region of a piping component
2540
End
FIG. 25

POLYURETHANE PIPE THREAD TAPE ASSEMBLY

FIELD

This disclosure generally relates to pipe thread tape and, more specifically, to pipe thread tape that can be wound around pipe threads to help seal connecting pipes and/or pipe joints.

BACKGROUND

Pipes are frequently used to move and transport fluids (such as liquids and/or gases). When setting up piping systems, pipelines, etc., numerous piping components may be joined together. Piping components can include components such as pipes, fittings, valves, flanges, gaskets, supports, bellows, and/or any other components used in piping systems. One example way to connect various piping components is through threads. The various piping components can include threads (such as screw threads, as an example) on their end(s), and corresponding threads (male threads and female threads, external threads and internal threads, etc.) can be connected together through the threads. For example, the corresponding ends of the piping components can be twisted together in order to wind together the threads. This can help seal the piping components together.

However, due to the threads, there may be instances where the piping components are not fully sealed together. For example, while the threads align with corresponding threads of another piping component, there can still be small amounts of space between the threads, which can prevent a full seal between the piping components. Pipe thread tape (also referred to as plumber's tape) can help fully seal the connection (e.g., the joint) between piping components. For instance, the pipe thread tape can help make a watertight and/or airtight seal between piping components.

As chemistry has advanced, more has become known about certain chemicals, such as forever chemicals. Forever chemicals (such as per- and polyfluoroalkyl substances (PFAS)) can pose health and environmental risk. To reduce and/or prevent these risks, it would be desirable to provide pipe thread tape that does not include any forever chemicals (i.e., a PFAS-free pipe thread tape), as many existing pipe thread tape materials (such as Teflon and/or other PFAS containing materials) do contain forever chemicals.

SUMMARY

In general, this disclosure is directed to pipe thread tape and, more specifically, to pipe thread tape that can be wound around pipe threads to help seal connecting pipes and/or pipe joints. In one example, the present disclosure includes a method of installing pipe thread tape between a first piping component (such as a first pipe) and a second piping component (such as a second pipe). The method can include wrapping the pipe thread tape around external threads at an end region of the first piping component, resulting in a wrapped end region of the first piping component. The pipe thread tape can include a polyurethane film and an adhesive, such that the adhesive is at a first side of the pipe thread tape, and the wrapped end region of the first piping component has the first side of the pipe thread tape against the end region of the first piping component such that the adhesive contacts the external threads. The polyurethane film can have an elongation upon breaking between 5 inches and 24 inches. Additionally or alternatively, the adhesive can have a peel strength between 125 g/25 mm and 225 g/25 mm. The method can also include attaching the wrapped end region of the first piping component to an internally threaded end region of the second piping component.

In another example, the present disclosure includes a method of using pipe thread tape. The method can include separating pipe thread tape from a paper liner. In the present method, the pipe thread tape includes a polyurethane film and an adhesive, such that the adhesive is at a first side of pipe thread tape. The paper liner is initially coupled with the pipe thread tape via the adhesive, such that the coupled paper liner and pipe thread tape together form a pipe thread tape assembly. The pipe thread tape has greater stretchiness than the paper liner. Separating the pipe thread tape from the paper liner can include stretching the pipe thread tape assembly to elongate it lengthwise such that an entire width of the paper liner tears without tearing the polyurethane film, thereby creating a loose torn end (or "tail") of the paper liner. Separating the pipe thread tape from the paper liner can also include grabbing the loose torn end of the paper liner and pulling it away from the pipe thread tape to separate the paper liner from the pipe thread tape. The method can also include (optionally after separating the paper liner) wrapping the pipe thread tape around external threads at an end region of a piping component, such that the first side of the pipe thread tape is against the end region of the piping component with the adhesive contacting the external threads.

In another example, the present disclosure includes a method of using pipe thread tape. The method can include providing a pipe thread tape assembly in packaging. The pipe thread tape assembly includes a pipe thread tape. The pipe thread tape includes a polyurethane film and an adhesive, such that the adhesive is at a first side of pipe thread tape. The pipe thread tape assembly can also include a paper liner coupled to the pipe thread tape via the adhesive. The method can also include dispensing the pipe thread tape assembly from the packaging. In addition, the method can include separating the paper liner from the pipe thread tape, thereby exposing the adhesive. Separating the pipe thread tape from the paper liner can include stretching the pipe thread tape assembly lengthwise such that an entire width of the paper liner tears without tearing the polyurethane film. The method can also include wrapping the pipe thread tape around external threads at an end region of a piping component, such that the first side of the pipe thread tape is against the end region of the piping component with the adhesive contacting the external threads.

In another example, the present disclosure includes a method of installing pipe thread tape between a first piping component (such as a first pipe) and a second piping component (such as a second pipe). The method can include wrapping the pipe thread tape around external threads at an end region of the first piping component, resulting in a wrapped end region of the first piping component. The pipe thread tape can include a polymer film and an adhesive, such that the adhesive is at a first side of the pipe thread tape, and the wrapped end region of the first piping component has the first side of the pipe thread tape against the end region of the first piping component such that the adhesive contacts the external threads. Preferably, the polymer film is formed of (e.g., consists of) PFAS-free polymer. Also, the adhesive preferably has a peel strength between 125 g/25 mm and 225 g/25 mm. The method can also include attaching the wrapped end region of the first piping component to an internally threaded end region of the second piping component.

The details of one or more examples are set forth in the accompanying drawings and the description below. Other features, objects, and advantages will Preferably be apparent from the description and drawings, and from the claims.

BRIEF DESCRIPTION OF DRAWINGS

The following drawings are illustrative of particular embodiments of the present invention and, therefore, do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

FIG. 3 is a flow diagram of a method of installing pipe thread tape, according to an embodiment.

FIG. 11 is a block diagram of an unstretched pipe thread tape assembly with a torn liner, according to an embodiment.

FIG. 12 is a block diagram of a pipe thread tape assembly with a torn end of the liner, according to an embodiment.

FIGS. 13A-13B are schematic diagrams of a pipe thread tape assembly being stretched, according to an embodiment.

FIG. 15 is a flow diagram of a method of using pipe thread tape, according to an embodiment.

FIG. 21 is a schematic diagram of an example packaging for the pipe thread tape, according to an embodiment.

FIG. 22 is a schematic diagram of another example packaging for the pipe thread tape, according to an embodiment.

FIG. 23 is a schematic diagram of an example core-less pipe thread tape roll, according to an embodiment.

FIG. 24 is a schematic diagram of an example pipe thread tape roll with a core, according to an embodiment.

FIG. 25 is a flow diagram of a method of using pipe thread tape, according to an embodiment.

DETAILED DESCRIPTION

Figure 1:
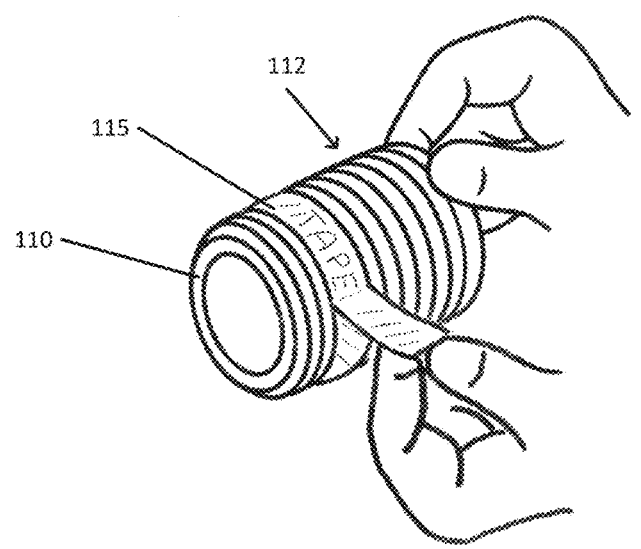
FIG. 1 is a schematic diagram of pipe thread tape being wrapped around pipe threads, according to an embodiment.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

As discussed herein, it is desirable to have a pipe thread tape material that does not contain any forever chemicals (e.g., is PFAS-free) in order to help reduce and/or prevent health and environmental risks due to forever chemicals. Further, regulations and restrictions of using PFAS-containing pipe thread tape are growing. For example, some water treatment plants are starting to regulate, restrict, and/or move away from PFAS-containing tape. However, while it is beneficial to have PFAS-free pipe tape in order to reduce/ prevent health and environmental risks due to forever chemicals, PFAS-containing tape has certain properties that are desirable for pipe thread tape. These properties can include being stretchy and malleable in order to conform to the threads of the pipe; being resistant to water and, in some instances, other chemicals; being able to handle different temperatures; etc.

To avoid using PFAS to seal piping components, other method(s) of sealing have been used. One example method includes using fabric, felt, nonwoven web, fibers, etc. to fill in the majority of space between the threads, and then applying some sort of compound and/or paste in order to fill in any gaps/crevices not filled by the fabric, felt, nonwoven web, fibers, etc. However, this process can be more time consuming (as it is a multi-step process) compared to a plumber's tape (i.e., pipe thread tape), and materials such as fabric, felt, nonwoven web, fibers (such as hemp and/or other types of fibers), etc. can be more susceptible to issues such as swelling, potential bacteria growth, brittleness over time, etc.

One example material that does not contain PFAS and that can be stretchy and malleable, resistant to water and other chemicals, able to handle different temperatures, etc. is polyurethane. In addition, polyurethane can be strong/tough and durable, resulting in a beneficial combination of elasticity, flexibility, strength (e.g., mechanical strength), and durability. Therefore, a pipe thread tape made of polyurethane (i.e., a polyurethane pipe thread tape) is discussed herein. Suitable polyurethane film is commercially available from a variety of suppliers, including Polymer Science, Inc. (Monticello, Indiana, USA). In some instances, a polyurethane pipe thread tape may effectively stretch around and fill into the threading of the piping component(s). The polyurethane tape, however, may not stick to the piping component/ threads, which can make its application difficult and/or cause the pipe thread tape to become displaced during the installation process and/or while joining (e.g., twisting together) the piping components. Therefore, in some embodiments, the pipe thread tape, in addition to including a polyurethane film, can include an adhesive. In some instances, the adhesive can be a light adhesive, for example one that is just sticky enough to grab onto the piping component while wrapping the tape around the threaded end of the piping component and so that the tape will stay in place during the joining/connecting of the piping components. The adhesive may only need to hold/be effective during the wrapping stage, and preferably long enough for the mating/corresponding piping component to be joined/connected with the threading of the first piping component. Once the piping components are mated and/or joined, the pipe thread tape may be mechanically held by (e.g., compressed snuggly between) the threads of the piping components, and therefore the adhesive may no longer be needed for holding the tape in place.

Referring now to FIG. 1, a schematic diagram of pipe thread tape 115 being wrapped around pipe threads 112 is illustrated, according to an embodiment. As discussed herein, pipe thread tape (such as pipe thread tape 115) can be used to help seal a connection between piping components. Piping components can refer to components used in a piping system, and can include components such as pipes, fittings, valves, flanges, gaskets, supports, bellows, and/or any other components. In any embodiment of this disclosure, the piping components can optionally be pipes. To help connect various piping components, the piping components can include threads that can be twisted together. This can wind together the piping components and help connect them and seal them together. In some embodiments, the threads can be at one or more ends of the piping components (for example, the end(s) where the piping component has the possibility of being joined with another piping component). In some embodiments, the threads can be along an entire length of the piping component.

FIG. 1 illustrates a piping component 110 with threads 112. Piping component 110 can be any type of piping component. In some embodiments, although piping component 110 is illustrated as a relatively small piping component, piping component 110 can be any size (any desired length, diameter, etc.). Further, although piping component 110 illustrates threads 112 along an entire length of the piping component 110, piping component 110 could instead only have threads 112 along one or more end regions of the piping component 110 (for example, without any threads in a middle region of the piping component 110). In some instances, the illustrated piping component 110 could be just a first end of a longer piping component such that it includes additional length not illustrated in FIG. 1. The piping component 110 illustrated in FIG. 1 is exemplary and is not intended to be limiting.

As illustrated in FIG. 1, pipe thread tape 115 can be applied to a piping component 110. In some instances, this includes wrapping the pipe thread tape 115 around threads 112 of a piping component 110. In some embodiments, the pipe thread tape 115 can be wrapped around at least an end region of a piping component 110. In some embodiments, the pipe thread tape 115 can be wrapped around an entire threaded portion of the piping component 110. The portion of the piping component 110 wrapped in pipe thread tape 115 illustrated in FIG. 1 is exemplary and is not intended to be limiting. For example, the tape 115 could continue to be wrapped around more (optionally all) threads 112 of the piping component 110. In another example, the tape 115 could have a different width, which could result in more or less of the threads 112 being covered with pipe thread tape 115, as a greater width of tape 115 would cover more threads 112 when being wrapped around the piping component 110, whereas a lesser width of tape 115 would cover less threads 112 when being wrapped around the piping component 110. In an exemplary embodiment, the pipe thread tape 115 can have a width between 0.25 inch (in) and 1.0 in.

Preferably, a side of the pipe thread tape 115 with exposed adhesive is the side being wrapped around the piping component 110. This can result in the adhesive being in direct contact with the threads 112, which can help improve the installation of (e.g., wrapping) the pipe thread tape 115 and/or the effectiveness of the tape 115 after the piping components have been joined, as the pipe thread tape 115 may stay in its desired place due to the adhesive. As discussed herein, polyurethane pipe thread tape (such as pipe thread tape 115, for example) may become displaced during the joining/connecting process if it does not include an appropriate adhesive layer (e.g., a light adhesive layer such as a single coat adhesive layer, with light adhesion properties).

In some embodiments, applying the pipe thread tape 115 (e.g., wrapping the pipe thread tape 115 around a piping component 110) can include stretching the pipe thread tape 115 into the grooves of the threads 112 of the piping component 110. This can help the pipe thread tape 115 fill the gaps/grooves between threads 112, which can help improve the seal between piping components.

In some embodiments, as discussed herein, piping components that are being joined together may have corresponding threads. These corresponding threads can include external threads (also referred to as male threads) on a first piping component and internal threads (also referred to as female threads) on a second piping component. In some embodiments, as illustrated in FIG. 1, the pipe thread tape 115 is wrapped around external threads 112.

Figure 2:
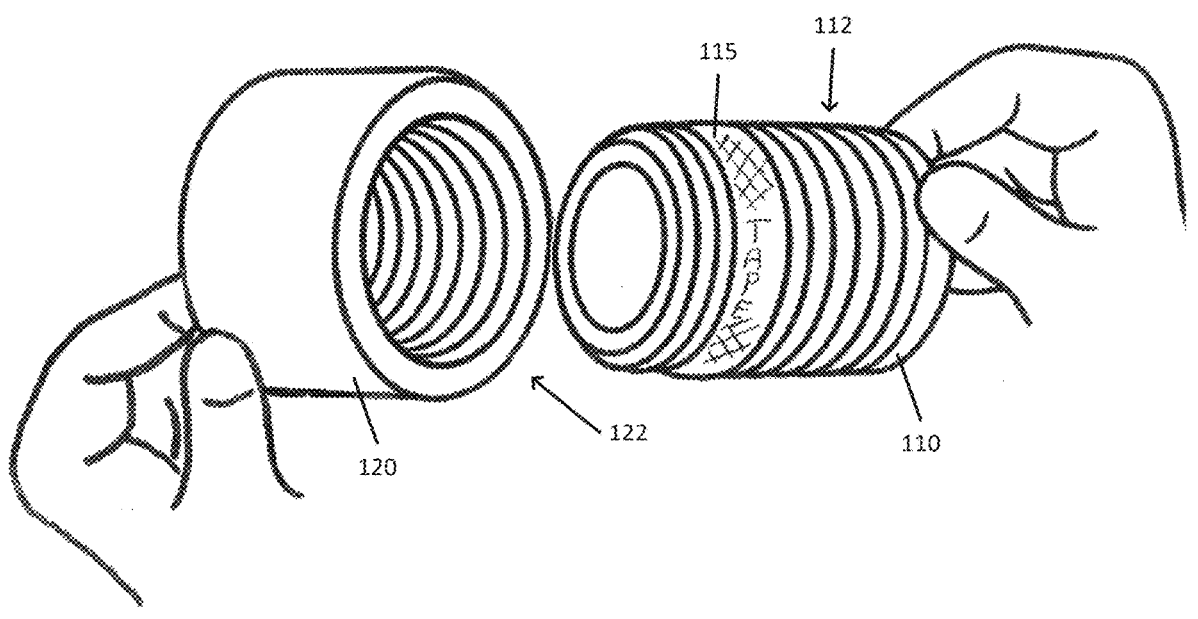
FIG. 2 is a schematic diagram of piping components being joined and sealed with pipe thread tape, according to an embodiment.

FIG. 2 illustrates piping components being joined and sealed with pipe thread tape, according to an embodiment. Once the pipe thread tape 115 has been wrapped around the desired amount of external threads 112 of piping component 110, the piping component 110 can be joined/connected with a corresponding piping component 120. As illustrated in FIG. 2, piping component 120 can have internal threads 122. These threads 122 are complimentary to threads 112, and are able to mate/connect together. Therefore, the wrapped region of the piping component 110 can be attached with the internally threaded piping component 120. In some instances, this can include twisting together the external threads 112 and internal threads 122 and their corresponding piping components (piping components 110 and 120, respectively).

In some embodiments, as illustrated in FIGS. 1 and 2, the pipe thread tape 115 may only be applied to a portion of the threaded region of the piping component 110. In these embodiments, additional threads 112 that have not been covered in pipe thread tape 115 may still be attached to/joined with the threads 122 of the corresponding piping joint 120. Put differently, some unwrapped threads 112 may still be twisted together with threads 122 to attach the piping components 110 and 120. In these instances, the lesser amount of pipe thread tape 115 may be enough to effectively seal the piping components 110, 120 when joined.

FIG. 3 illustrates an example method 300 of installing pipe thread tape between a first piping component (such as piping component 110) and a second piping component (such as piping component 120), according to an embodiment. Method 300 can include operation 310 of wrapping pipe thread tape around external threads at an end region of the first piping component. This can correspond to FIG. 1, in some instances, with the pipe thread tape being the illustrated pipe thread tape 115, the external threads being the illustrated threads 112, and the first piping component being the illustrated piping component 110. Therefore, operation 310 will be discussed herein relative to FIG. 1.

In some embodiments, as discussed herein relative to FIG. 1, operation 310 of wrapping the pipe thread tape 115 around the external threads 112 can include stretching the pipe thread tape 115 into grooves of the external threads 112 at the end region (i.e., the connecting/joining region) of the first piping component 110. This can help close any gaps between threads 112, which can help effectively seal the piping components 110 and 120.

In some embodiments, as will be discussed further herein, the pipe thread tape 115 can be adhered removably to a liner, such as a paper liner, prior to being wrapped around external threads 112 at the end region of the first piping component 110. The pipe thread tape 115 with the adhered paper liner can be referred to herein as a pipe thread tape assembly. The paper liner can help protect the adhesive and help prevent the adhesive from losing effectiveness (i.e., losing stickiness) prior to being wrapped around the piping component 110. Therefore, in some embodiments, method 300 can further include, prior to wrapping the pipe thread tape 115 around external threads 112 at the end region of the first piping component 110, separating the pipe thread tape 115 from the paper liner. This can expose the adhesive of the pipe thread tape 115 before wrapping it around the external threads.

Method 300 can also include operation 320 of attaching the wrapped end region of the first piping component 110 to an internally threaded end region of a second piping component 120. This can correspond to FIG. 2, in some instances, and will be discussed in relation to FIG. 2. The internal threads 122 of the second piping component 120 can correspond to (e.g., be configured to threadingly engage) the external threads 112 of the first piping component 110. Thus, the piping components 110, 120 can be attached and joined together. In some instances, this can include twisting the piping components 110, 120 and their corresponding threads 112, 122 together (e.g., rotating one relative to the other). When the threads 112, 122 are twisted together, the pipe thread tape 115 can become compressed between the threads 112, 122, which can help create a seal between the piping components 110, 120. In some instances, this can be referred to as creating a seal at the pipe joint. The pipe joint can be the connection between piping components 110, 120. Once the wrapped end region of the first piping component 110 is attached to the internally threaded region (i.e., internal threads 122) of the second piping component 120, the pipe thread tape 115 creates a seal between the external threads 112 at the end region of the first piping component 110 and the internal threads 122 at internally threaded end region of the second piping component 120.

Figure 4:
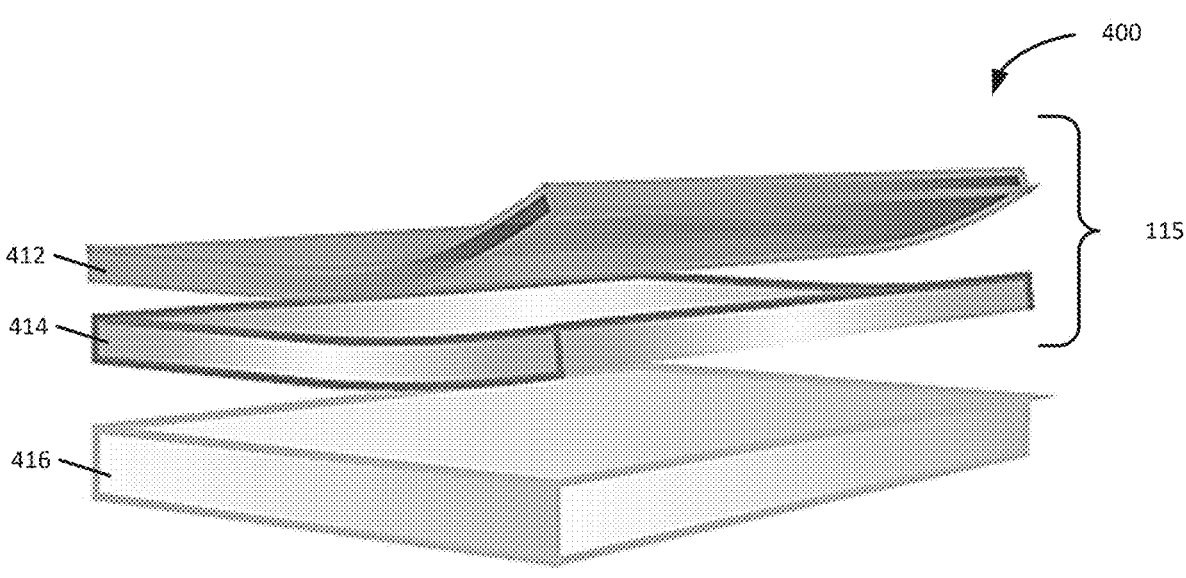
FIG. 4 is a schematic diagram of the components of an example pipe thread tape assembly, according to an embodiment.

FIG. 4 illustrates the components of an example pipe thread tape assembly 400, according to an embodiment. Pipe thread tape 115, as referred to herein, can include a polyurethane film 412 and an adhesive 414. The adhesive 414 can also be referred to as an adhesive backing 414. The polyurethane film 412 can be stretchy and malleable, resistant to water and other chemicals, able to handle different temperatures, durable, etc. Such properties are beneficial for the effectiveness of pipe thread tape 115. Further, polyurethane film 412 does not contain PFAS, which helps prevent health and environmental risks. However, as discussed herein, if the pipe thread tape 115 only contained polyurethane film 412, the pipe thread tape 115 may not be easy to wrap around the threaded end of a piping component and/or may not stay in place and may be displaced during the attachment of the piping components 110, 120.

Therefore, to help secure the polyurethane film 412 around the piping component 110 during the attachment/ joining process, the pipe thread tape can include an adhesive layer 414 (also referred to as simply adhesive 414). In some embodiments, the adhesive 414 is a single-coat adhesive 414. For example, the pipe thread tape 115 can have a single coat of the adhesive 414 on the polyurethane film 412. In some embodiments, the adhesive 414 can be an acrylic adhesive. Suitable acrylic adhesive can be coated onto polyurethane film by various commercial chemical companies, including Polymer Science, Inc. Preferably, the adhesive 414 has a peel strength between 125 grams (g)/25 millimeters (mm) and 225 g/25 mm. As discussed herein, the adhesive 414 may only need to be sticky enough to secure the pipe thread tape 115 during the wrapping and attaching process, so its adhesive properties may not need to last once the piping components 110, 120 have been joined and attached. In some embodiments, such as certain examples where the adhesive 414 is acrylic adhesive, it can have a peel strength between 150 g/25 mm and 200 g/25 mm. The adhesive can optionally have a peel strength within any one or more of these ranges in any embodiment of this disclosure.

The peel strength values discussed herein are determined using a conventional 180° peel strength test. The peel strength test includes adhering and/or otherwise attaching a sample with the adhesive 414 to a testing machine. The sample used in the testing reported herein had a width of about 25 mm. It is to be appreciated, however, that the pipe thread tape in any embodiments of the present disclosure can have various different widths. For the present peel strength testing, however, the sample tested should have a width of about 25 mm. Before or after attaching the sample, the machine is calibrated and configured according to standard operating procedures (SOPs) for operation of the adhesion release tester for a 180° test run. The test speed is set to 40 inches (in)/minute (min) for the liner release analysis. Once the machine is calibrated and configured, and the test speed is set, the adhesive pull test is run on the sample. The adhesive pull test includes having the machine pull apart/ separate the materials and measure the data. Specifically, the test sample with adhesive 414 is pulled away from the machine using a 180° peel at a speed of approximately 40 in/min. The machine gathers data during the adhesive pull test and determines a resulting peel strength for the adhesive 414. Specifically, as the adhesive is pulled/separated at a constant speed, the machine measures and determines the average force per unit width as the peel strength.

In some embodiments, the polyurethane film 412 has an elongation upon breaking between 0 inches and 24 inches. In some instances, the polyurethane film 412 can have an elongation upon breaking of at least five inches, such as between 5 inches and 24 inches; an elongation upon breaking of at least ten inches, such as between 10 inches and 24 inches; etc. In a preferred embodiment, the polyurethane film 412 can have an elongation upon breaking of between 5 inches and 24 inches. In some embodiments, the polyurethane film 412 can have any elongation upon breaking greater than or equal to 5 inches. Additionally or alternatively, in some instances, the polyurethane film 412 can have a breaking force between 50 grams (g)/millimeter (mm)

width and 150 g/mm width. The breaking force indicates the force required to cause the film 412 to tear and/or break. Having just the right elongation upon breaking and/or breaking force can help the pipe thread tape 115 and polyurethane film 412 stretch and compress into the threads 112 and/or 122 of the piping components 110 and/or 120. Further, as will be discussed herein, the stretchiness (e.g., the elongation upon breaking) of the pipe thread tape 115 and the polyurethane film 412 can be utilized as a removal technique for the liner 416. The polyurethane film 412 can optionally have an elongation upon breaking and/or breaking force within any one or more (optionally all) of the ranges noted in this paragraph for any embodiment of this disclosure. Furthermore, this can optionally be in combination with the adhesive having a peel strength in any range noted previously.

Figure 6:
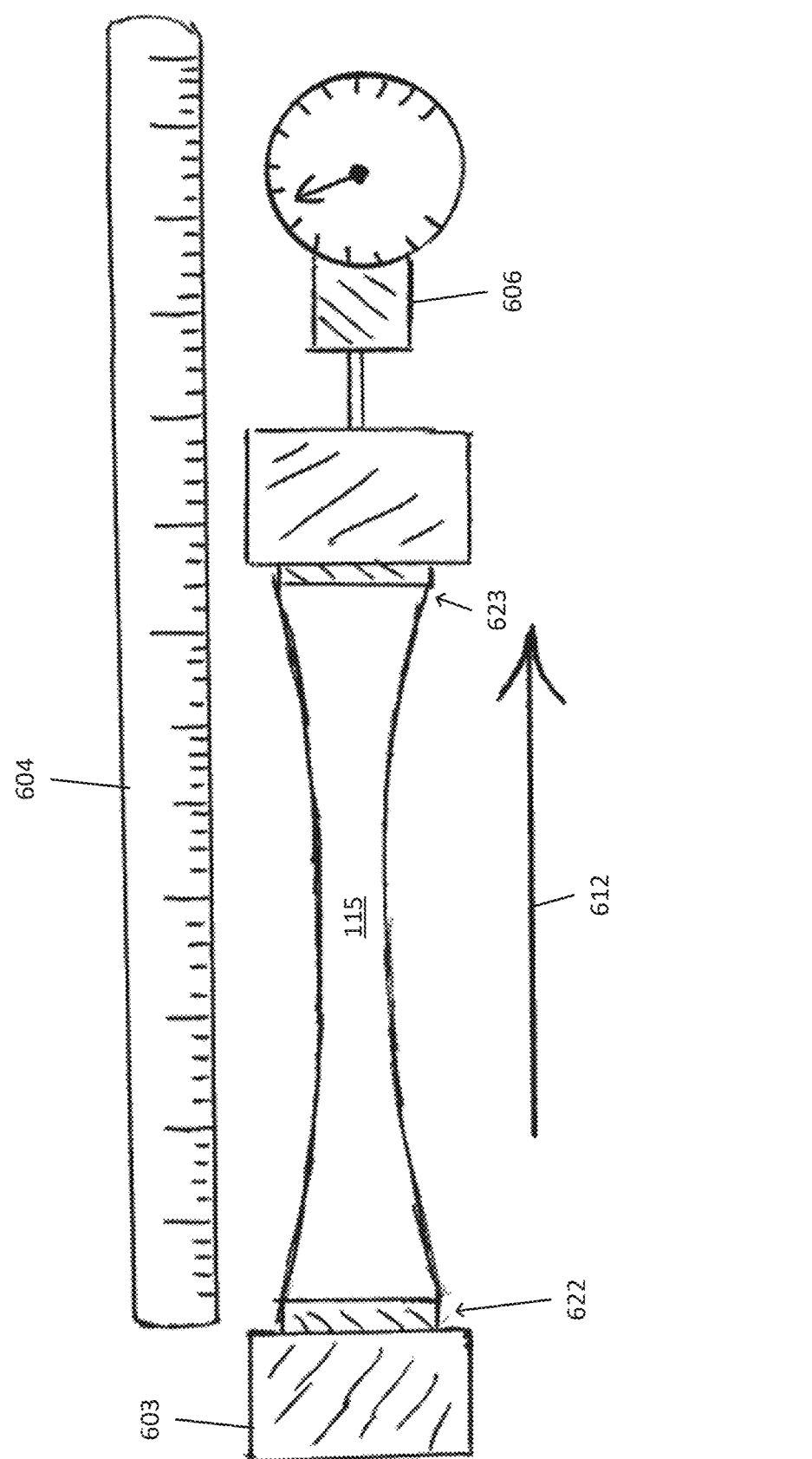
FIG. 6 is a schematic diagram of an elongation test, according to an embodiment.

The elongation upon breaking values discussed herein are determined using a conventional elongation test. FIG. 6 illustrates a conventional elongation test setup 600. The elongation test will be discussed herein using the pipe thread tape 115, however the test can be performed using the pipe thread tape 115 (with the polyurethane film 412 and the adhesive 414) or just the polyurethane film 412 (without adhesive 414), as the results should remain the same. The elongation test includes securing a first end 622 of the pipe thread tape 115 such that the first end 622 of the pipe thread tape 115 is secured and/or held in place. The first end 622 can be secured using a clamp, one or more weights, and/or any other securing entity/object. In FIG. 6, object 603 is the securing object 603. The elongation test also includes securing a second end 623 of the pipe thread tape 115 to a pull gauge 606. A pull gauge 606 is a tool that measures the force of a pull. The pull gauge 606 used in the elongation test discussed herein displays the measurement in units such as grams. A pull gauge that displays the measurement in a unit that can be directly converted to grams (such as kilograms, pounds, etc.) could also be used as the pull gauge 606.

A side of the of the pipe thread tape 115 is positioned alongside a ruler 604 to help get an accurate reading of the elongation upon breaking. Once the elongation test has been set up, the second end of the of the pipe thread tape 115 is pulled horizontally (i.e., lengthwise) at a constant speed until the pipe thread tape 115 tears and/or breaks. The horizontal pull is illustrated as arrow 612, and referred to herein as pull 612. For instance, as the second end 623 of the pipe thread tape 115 is attached to a pull gauge 606, the pull gauge 606 can be pulled at a constant speed away from the secured first end 622 in order to pull and stretch the pipe thread tape 115. The constant speed at which the second end 623 is pulled 612 is about 4 seconds/foot. At the time of breakage, the length of the pipe thread tape 115 is measured using the ruler 604 to determine the elongation (i.e., increased length) upon breakage. For the present test, the length of the pipe thread tape 115 prior to any elongation or pulling 612 (i.e., the starting/initial length of the pipe thread tape 115) is about 8 inches. In more detail, about 2 inches of length on the first end 622 of pipe thread tape 115 is held/secured by securing object 603, about 5 inches of length on the second end 623 of the pipe thread tape 115 is held, secured, and/or attached to the pull gauge 606, and about 1 inch of length of the pipe thread tape 115 is stretched. Thus, determining the elongation upon breaking involves determining the difference between the elongated length and the initial length of the pipe thread tape 115.

In some embodiments, in addition to measuring elongation upon breaking, the force required to tear/break the pipe thread tape 115 can be measured. This is referred to herein as the breaking force. The breaking force is measured during the conventional elongation test discussed herein and illustrated in FIG. 6. To determine the breaking force, the pull gauge 606 is used. As discussed herein, the pull gauge 606 measures the force of a pull (in this instance, pull 612) and displays the measurement in units such as grams or units that can be converted to grams. To determine the breaking force, the weight is measured at the time of breakage and read from the pull gauge 606 that is attached to the second end of the pipe thread tape 115. The breaking force is determined by dividing the reading from the pull gauge 606 by the width of the pipe thread tape 115. The reading can be in grams and the width of the pipe thread tape 115 can be in millimeters, in some instances. This can give a resulting breaking force in units of grams per millimeter width (i.e., g/mm width).

The width of the pipe thread tape 115 can, for example, optionally be 0.25 inch (i.e., 6.35 mm), 0.5 inch (i.e., 12.70 mm), or 0.75 inch (19.05 mm). These widths may be approximate, in some instances. These widths are merely examples and the pipe thread tape can have any desired width.

Referring back to FIG. 4, the pipe thread tape assembly 400 can include a liner 416 removably adhered to the adhesive 414. This can help protect the adhesive 414 and retain its effectiveness until the pipe thread tape 115 with the adhesive 414 is to be wrapped around the external threads 112. The liner 416 is removed from the adhesive 414 and the pipe thread tape 115 prior to the tape 115 being wrapped around the threads 112 of the piping component 110. In some embodiments, the liner 416 is a paper liner 416. In some instances, the liner 416 can have a stretchiness (for example, an elongation upon breaking) less than the pipe thread tape 115 and the polyurethane film 412. Put differently, the pipe thread tape 115 and the polyurethane film 412 can have a greater stretchiness and elongation upon breaking than the liner 416; which can optionally be a paper liner. In some embodiments, the liner 416 can be a siliconized paper liner.

In some instances, the pipe thread tape 115 and the pipe thread tape assembly 400 can be devoid of a base layer that includes fabric, felt, nonwoven web, etc. This can optionally be the case for any embodiment of the present disclosure. Being devoid of fabric, felt, nonwoven web, etc. can include being devoid of fibers. As discussed herein, in some instances, fabric, felt, nonwoven web, fibers, etc. can be used to help seal piping components. However, the use of these materials can be more time consuming and/or can be susceptible to other issues such as swelling, potential bacteria growth, brittleness over time, etc. Therefore, the pipe thread tape 115 and the pipe thread tape assembly 400 may not use any sort of fabric, felt, nonwoven web, etc., in some instances.

Figure 5:
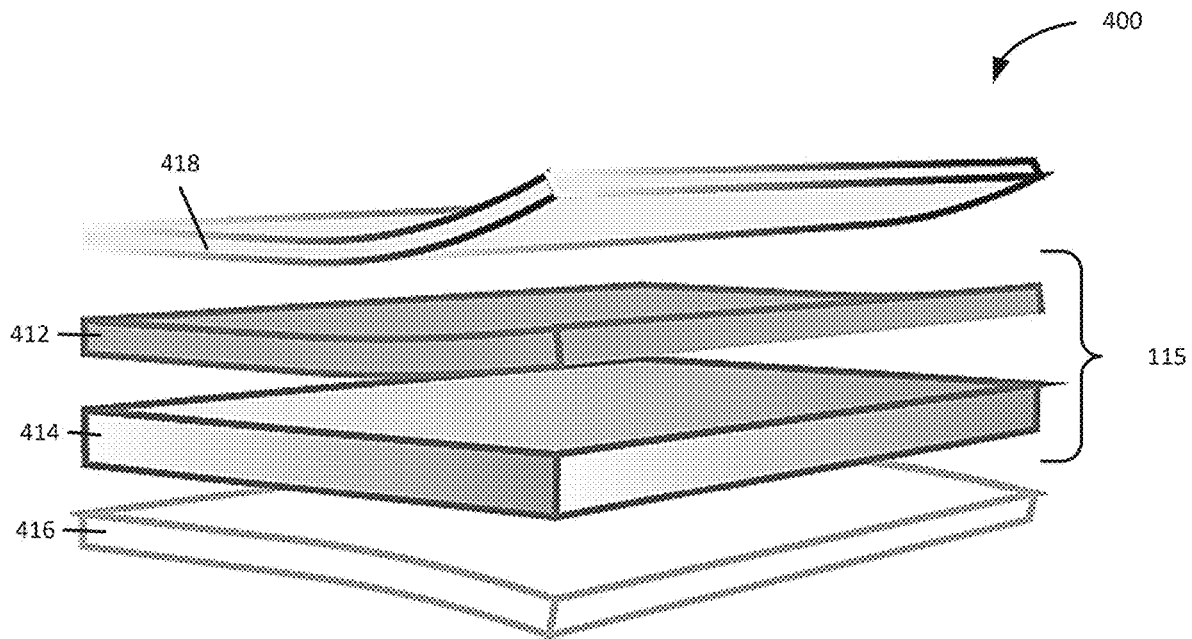
FIG. 5 is a schematic diagram of the components of another example pipe thread tape assembly, according to an embodiment.

In some embodiments, the pipe thread tape assembly 400 can further include a casting layer 418. This is illustrated in FIG. 5. When the polyurethane film 412 and/or pipe thread tape 115 is formed, the polyurethane may be spread onto a casting layer 418 to form a polyurethane film 412. In some instances, the casting layer 418 may remain adhered to the polyurethane film 412 during the application of the adhesive 414 and the liner 416. Therefore, in some instances, the casting layer 418 can be a part of the pipe thread tape assembly 400. In some embodiments, the casting layer 418 may be a polyethylene casting layer 418. When initially provided, the casting layer 418 can be removed from the polyurethane film 412 prior to wrapping the pipe thread tape 115 around the externally threaded end region of the piping component 110 (for example, operation 310 of method 300).

Figures 7, 8:
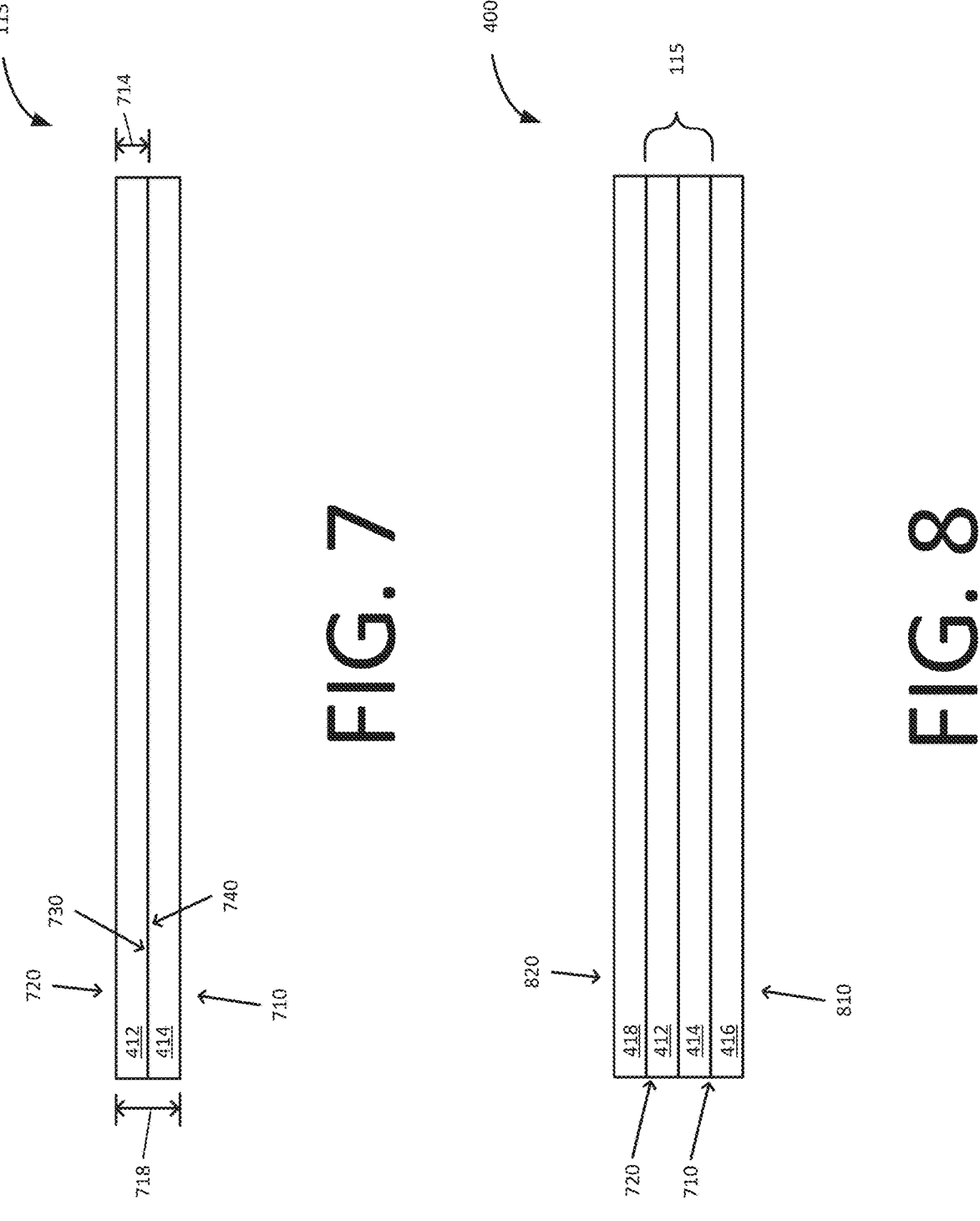
FIG. 7 is a block diagram of the layers of a pipe thread tape and its sides, according to an embodiment.
FIG. 8 is a block diagram of the layers of a pipe thread tape assembly and its sides, according to an embodiment.

FIGS. 7 and 8 illustrate block diagrams of the layers of the pipe thread tape 115 and the pipe thread tape assembly 400, respectively. The layers of the pipe thread tape 115 include the polyurethane film 412 and the adhesive 414, and the pipe thread tape assembly 400 can further include a liner 416 and, in some instances, a casting layer 418. In some embodiments, the polyurethane film 412 can have a thickness 714 between 20 microns (i.e., micrometers) and 75 microns. In some embodiments, the pipe thread tape 115 (including both the polyurethane film 412 and the adhesive 414) can have a thickness 718 between 0.03 mm and 0.10 mm. This can result in a pipe thread tape 115 that is thin enough to not prevent the piping components 110, 120 from being joined, while being thick enough to help create an effective seal between the piping components 110, 120.

The pipe thread tape 115 can be referred to as having a first side 710 and a second side 720. The first side 710 can be the adhesive 414 side of the pipe thread tape 115 and can be the side 710 where the adhesive 414 is exposed. The second side 720 can be the polyurethane film 412 side of the pipe thread tape 115. In some embodiments, when the pipe thread tape 115 is being wrapped around the piping component 110, the first side 710 of the tape 115 can be the side of the tape that is in contact with the external threads 112. Therefore, in some instances, the adhesive 414 can be at the first side 710 of the pipe thread tape 115 and the wrapped end region of the piping component 110 can have the first side 710 of the pipe thread tape 115 against the end region of the piping component 110 such that the adhesive 414 contacts the external threads 112. In some embodiments, the second side 720 of the pipe thread tape 115 is the side in contact with the internal threads 122 of the second piping component 120 once the piping components 110, 120 are attached.

In some embodiments, the first side 710 of the pipe thread tape 115 can also be described as a first side 710 of the adhesive 414, and the second side 720 of the pipe thread tape 115 can also be described as a second side 720 of the polyurethane film 412. Thus, the polyurethane film 412 can include a first side 730 and the acrylic adhesive 414 can further include a second side 740. The adhesive 414 can be on/coupled to the first side 730 of the polyurethane film 412 and the polyurethane film 412 can be on/coupled to the second side 740 of the acrylic adhesive 414. Put more simply, the first side 730 of the polyurethane film 412 and the second side 740 of the acrylic adhesive 414 can be coupled together (e.g., so as to define therebetween an interface) to form the pipe thread tape 115. Thus, the polyurethane film 412 and the adhesive layer 414 preferably are in contact with each other. This preferably is the case for any embodiment of this disclosure. As illustrated in FIG. 7, the first side 730 and the second side 720 of the polyurethane film 412 are opposite sides of the polyurethane film 412, and the first side 710 and the second side 740 of the adhesive 414 are opposite sides of the adhesive 414. Similarly, the first side 710 of the adhesive 414 (also the first side 710 of the pipe thread tape 115) is on a side of the pipe thread tape 115 opposite the second side 720 of the polyurethane film 412 (also the second side 720 of the pipe thread tape 115).

When the pipe thread tape 115 is adhered to the liner 416 and a casting layer 418 (e.g., when the pipe thread tape 115 is part of such a pipe thread tape assembly 400), the liner 416 can be adhered to the first side 710 of the pipe thread tape 115 and the casting layer 418 can be adhered to and/or connected to the second side 720 of the pipe thread tape 115. In these instances, the casting layer 418 can be coupled (e.g., removably bonded) to the second side 720 of the polyurethane film 412 and the pipe thread tape 115. Similarly, the liner 416 can be coupled (e.g., removably adhered) to the first side 710 of the adhesive 414 and the pipe thread tape 115. Pipe thread tape assembly 400 can include a first side 810 and a second side 820, in some embodiments. The first side 810 can be the liner 416 side and the second side 820 can be the casting layer 418 side, as illustrated in FIG. 8.

Figures 9, 10:
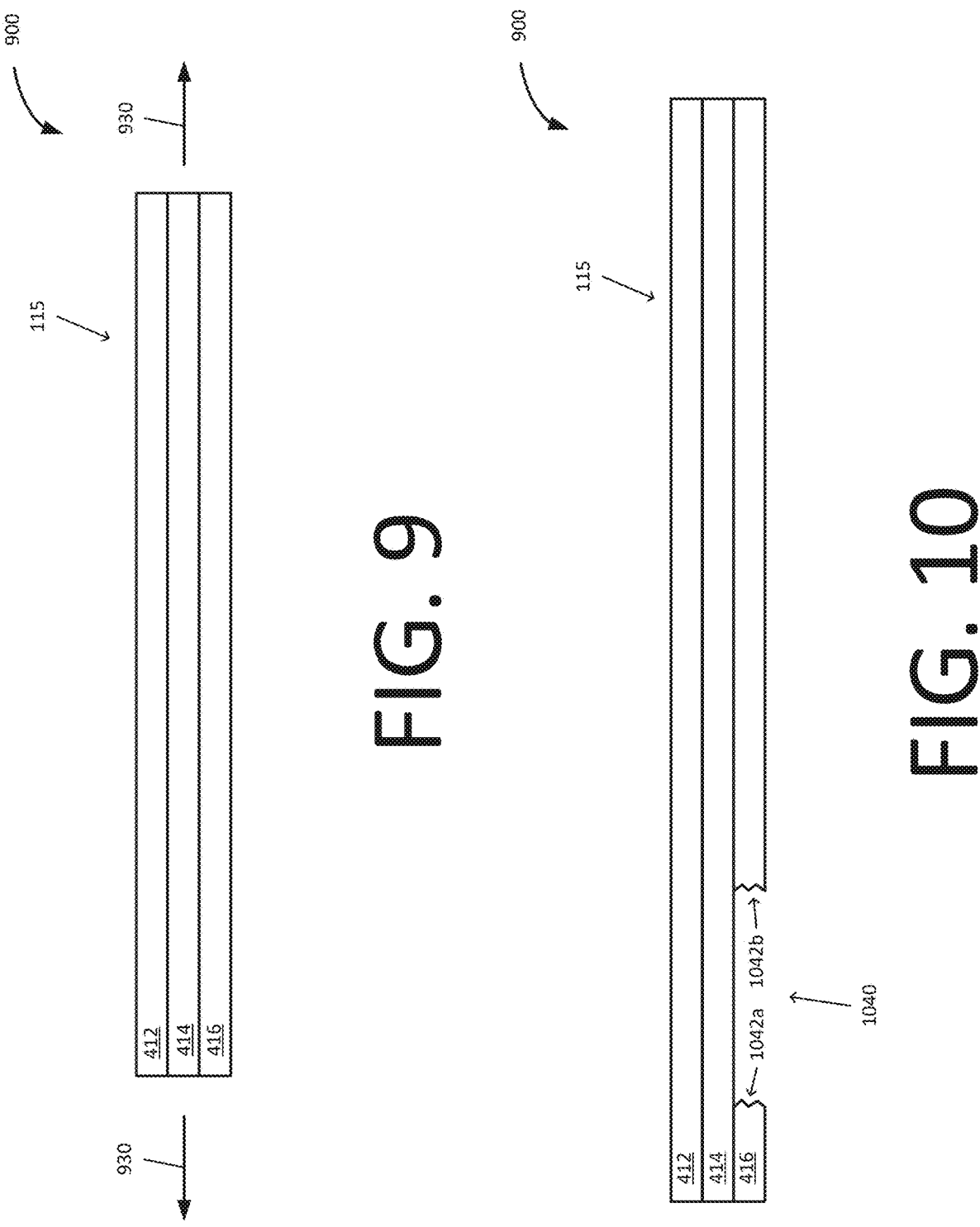
FIG. 9 is a block diagram of a pipe thread tape assembly being stretched, according to an embodiment.
FIG. 10 is a block diagram of a stretched pipe thread tape assembly with a torn liner, according to an embodiment.

In some embodiments, as discussed herein in relation to FIG. 4, a pipe thread tape assembly 400 can include at least a liner 416 removably coupled to the adhesive 414 of the pipe thread tape 115. FIG. 9 illustrates another example pipe thread tape assembly 900 with the liner 416 removably coupled to the pipe thread tape 115 and the adhesive 414. As discussed herein, it is desired to remove the liner 416 prior to wrapping the pipe thread tape 115 around the external threads 112 so that the adhesive 414 is exposed before doing the wrapping. This allows the adhesive 414 to stick to the threads 112 and hold the pipe thread tape 115 in place when being wrapped around external threads, and preferably also during the attaching/coupling of the piping components 110, 120. However, due to the stretchiness, elasticity, and other properties of the polyurethane film 412 and corresponding pipe thread tape 115, it may be surprisingly difficult to remove the liner 416 from the pipe thread tape 115.

In some embodiments, the preferred stretchiness of the pipe thread tape 115 and the polyurethane film 412 is surprisingly advantageous for helping to remove the liner 416. For example, as discussed herein, the pipe thread tape 115 and polyurethane film 412 can have a greater stretchiness (e.g., elongation upon breaking) than the liner 416, in some instances. The pipe thread tape 115 can also have a greater strength than the liner 416, in some instances. Therefore, when the pipe thread tape assembly 900 is stretched enough, it reaches a point where the liner 416 tears while the pipe thread tape 115 remains intact. This can create a loose end (or "tail") of the liner 416 that can be used to remove the remaining portions of liner 416. Therefore, in some embodiments, separating a length of the pipe thread tape 115 from the paper liner 416 can include stretching the pipe thread tape 115 and pipe thread tape assembly 900 lengthwise (shown by arrows 930, 1630, and 1730) such that an entire width of the liner 416 tears without tearing the polyurethane film 412 and the pipe thread tape 115.

FIG. 10 illustrates the pipe thread tape assembly 900 in its stretched form, also referred to herein as a stretched pipe thread tape assembly 900. When the pipe thread tape assembly is stretched 930 lengthwise, the pipe thread tape 115 can stretch while remaining intact, and this stretching can cause the paper liner 416 to tear 1040. This tear 1040 can result in one or more loose torn ends of the liner 416. FIG. 10 illustrates loose torn ends 1042a and 1042b. In some instances, stretching 930 the pipe thread tape assembly 900 may fully remove torn end 1042a, therefore the liner 416 may thereafter only have a single loose torn end (e.g., 1042b) in some instances.

FIG. 11 illustrates the pipe thread tape assembly 900 after the tear 1040 if it was no longer being stretched. Put differently, pipe thread tape assembly 900 is returned (shown by arrows 1130) to its non-stretched form in FIG. 11, e.g., due to its elasticity. As illustrated, the tear 1040 and the one or more loose torn ends 1042 of the liner 416 remain after the stretching stops.

FIG. 12 illustrates the pipe thread tape assembly 900 after a first portion of the liner 416 has been removed. In some instances, the first portion of the liner 416 may be removed during the stretching process (e.g., stretching 930). Preferably, the first portion of the liner 416 is removed by grabbing the loose torn end 1042a of the liner 416 and pulling it away from the pipe thread tape 115. This can expose a first portion of the adhesive 414. In some embodiments, the remaining portion of the liner 416 can be removed by grabbing loose torn end 1042b and pulling it away from the adhesive 414 and the pipe thread tape 115. This can fully separate the paper liner 416 from a desired length of the pipe thread tape 115, and can result in pipe thread tape 115 with exposed adhesive 414.

Figure 14:
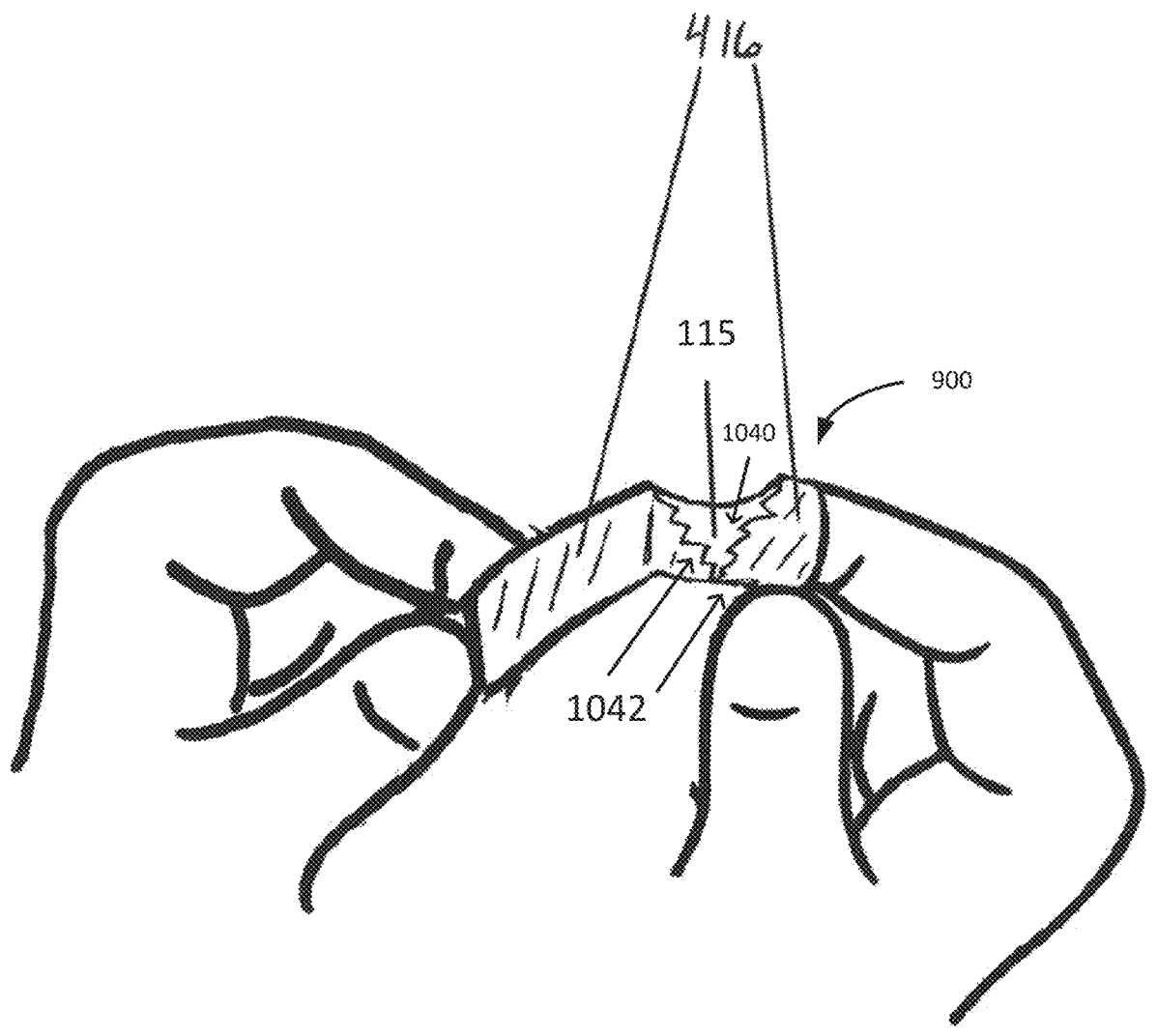
FIG. 14 is a schematic diagram of a pipe thread tape assembly with a torn liner, according to an embodiment.

FIGS. 13A, 13B, and 14 are additional schematic diagrams of a pipe thread assembly 900 being stretched and torn 1040. For instance, FIGS. 13A-13B are schematic diagrams of pipe thread tape assembly 900 being stretched 930, according to an embodiment. This can be the same as and/or similar to the stretching 930 illustrated in FIG. 9, in some instances. FIG. 9 illustrates a side view of the pipe thread tape assembly 900 being stretched 930 (i.e., elongated lengthwise), whereas FIGS. 13A-13B illustrate a top down view of the pipe thread tape assembly 900 being stretched 930. In some cases, the liner 416 can be the top layer in the top down view of pipe thread tape assembly 900. Put differently, side 810 of the pipe thread tape assembly can be the top side, in some instances. In some other cases, the polyurethane film 412 can be the top layer in the top down view of pipe thread tape assembly 900. Put differently, the side 720 of the pipe thread tape 115 can be the top side, in some instances.

In some embodiments, the pipe thread tape assembly 900 can be stretched 930, 1630, or 1730 (i.e., elongated lengthwise) until a tear forms in the liner 416. This is discussed herein in relation to FIGS. 10-12 and further illustrated in FIG. 14. Specifically, FIG. 14 is a schematic diagram of a pipe thread tape assembly 900 with a torn liner 416, according to an embodiment. In some embodiments, FIG. 14 illustrates the pipe thread tape assembly 900 at the same or similar stage as in FIG. 10. For example, FIG. 10 illustrates a side view of the pipe thread tape assembly 900 after a tear 1040 has been completed, whereas FIG. 14 illustrates a top down view of a pipe thread tape assembly 900 at the stage where a tear 1040 has just opened across an entirety of the width of the liner 416. FIG. 14 illustrates the liner 416 as the top layer of pipe thread tape assembly 900. Although liner 416 is illustrated as the top layer (e.g., with side 810 being the top side), the pipe thread tape assembly 900 could alternatively be oriented with polyurethane film 412 being the top layer and side 720 being the top side, in some instances.

As illustrated in FIG. 14, upon stretching/elongating the pipe thread tape assembly 900, a tear 1040 is forming in the liner 416 of the pipe thread tape assembly 900. This can create loose torn ends 1042 (for example, the same as or similar to loose torn ends 1042a and 1042b in FIG. 10). Although a tear 1040 is formed in the liner 416, the pipe thread tape 115 (including the adhesive 414 and the polyurethane film 412) do not tear and instead remain intact. This is shown in FIG. 14 with the pipe thread tape 115 remaining as a continuous single strip even with the tear 1040 in the liner 416.

FIG. 15 illustrates a method 1500 of using pipe thread tape, according to an embodiment. In some embodiments, method 1500 includes operation 1510 to separate pipe thread tape 115 from a paper liner 416. This can correspond to FIG. 9-14, 16, or 17 in some instances, and will be discussed herein in relation to FIGS. 9-14. In some embodiments, as illustrated in FIG. 9 and FIGS. 13A and 13B, separating pipe thread tape 115 from a paper liner 416 (i.e., operation 1510) can include operation 1512 to stretch 930 the pipe thread tape assembly 900 to elongate it lengthwise such that an entire width of the paper liner 416 tears 1040 without tearing the polyurethane film 412, thereby creating one or more loose torn ends 1042 of the paper liner 416.

Separating pipe thread tape 115 from a paper liner 416 (i.e., operation 1510) can further include operation 1514 to grab the loose torn end(s) 1042 of the paper liner 416 and pull them and/or it (depending on how many loose torn ends 1042 resulted from the tear 1040) away from the pipe thread tape 115. This can separate the paper liner 416 from a desired length of the pipe thread tape 115. Once the pipe thread tape 115 has been separated from the paper liner 416, method 1500 can include operation 1520 to wrap the pipe thread tape 115 around external threads 112 at an end region of a piping component 110, such that the first side of the pipe thread tape 115 is against the end region of the piping component 110 with the adhesive 414 contacting the external threads 112. This can correspond to FIG. 1, in some instances.

In some embodiments, although method 1500 and FIGS. 9-14 illustrate elongating the pipe thread tape assembly 900 lengthwise in order to stretch the pipe thread tape assembly 900, other ways of stretching the pipe thread tape assembly 900 can be used in order to help tear the liner 416. FIGS. 16-20 illustrate various exemplary ways to stretch the pipe thread tape assembly 900 in order to tear 1040 the liner 416 and create one or more loose torn ends 1042.

Figures 16, 17:
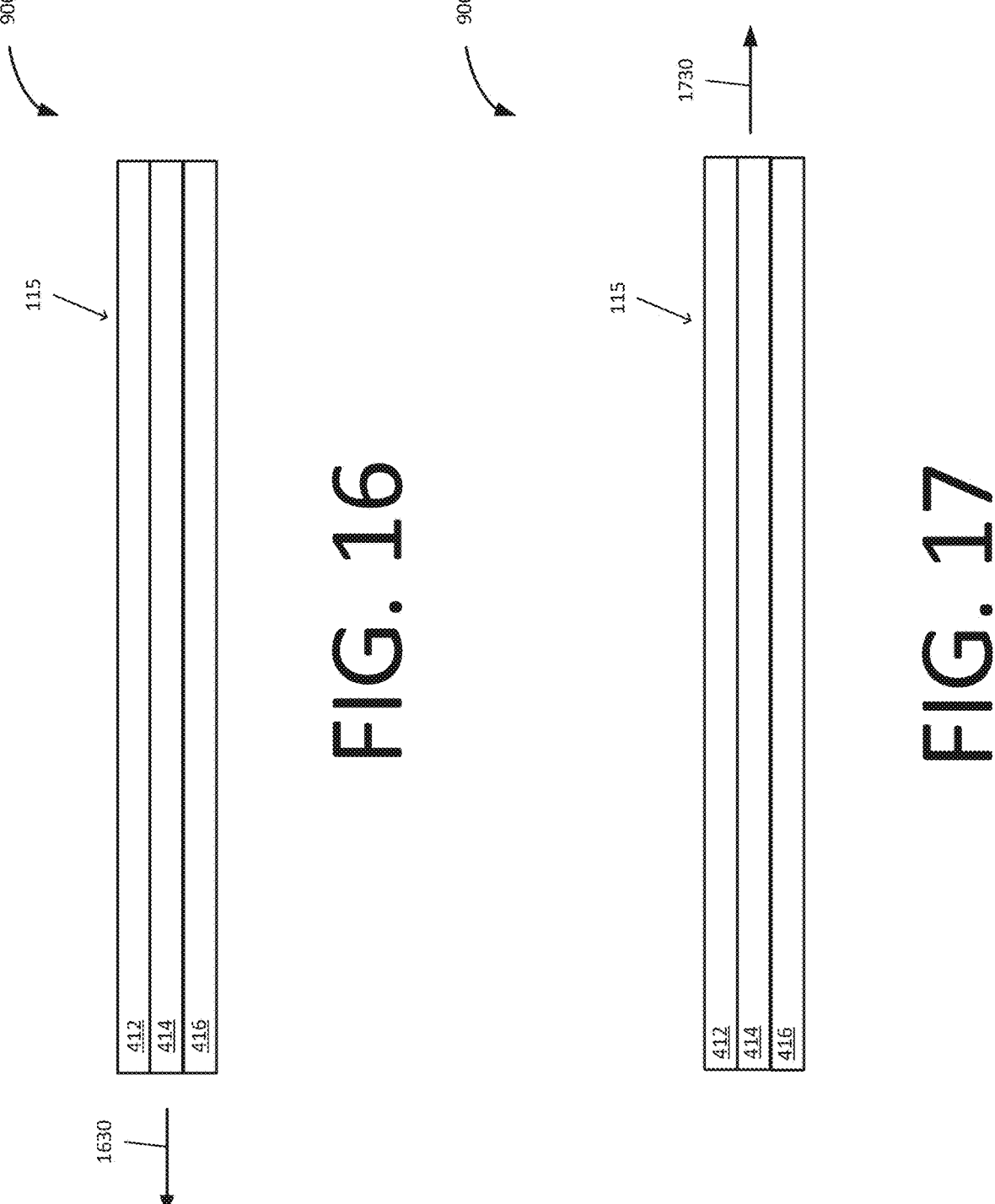
FIG. 16 is a block diagram of another exemplary way to stretch the pipe thread tape assembly, according to an embodiment.
FIG. 17 is a block diagram of still another exemplary way to stretch the pipe thread tape assembly, according to an embodiment.

For example, while FIGS. 9, 13A, and 13B illustrate the pipe thread tape assembly 900 being stretched 930 and elongated lengthwise in both directions, the pipe thread tape assembly 900 may be stretched by being elongated lengthwise only in a single direction. FIG. 16 illustrates a pipe thread tape assembly 900 being elongated lengthwise in direction 1630, whereas FIG. 17 illustrates pipe thread tape assembly 900 being elongated lengthwise in the opposite direction, direction 1730. In some embodiments, the pipe thread tape assembly 900 may be held in place at the opposite end of the stretching (1630 and/or 1730).

Figures 18, 19, 20:
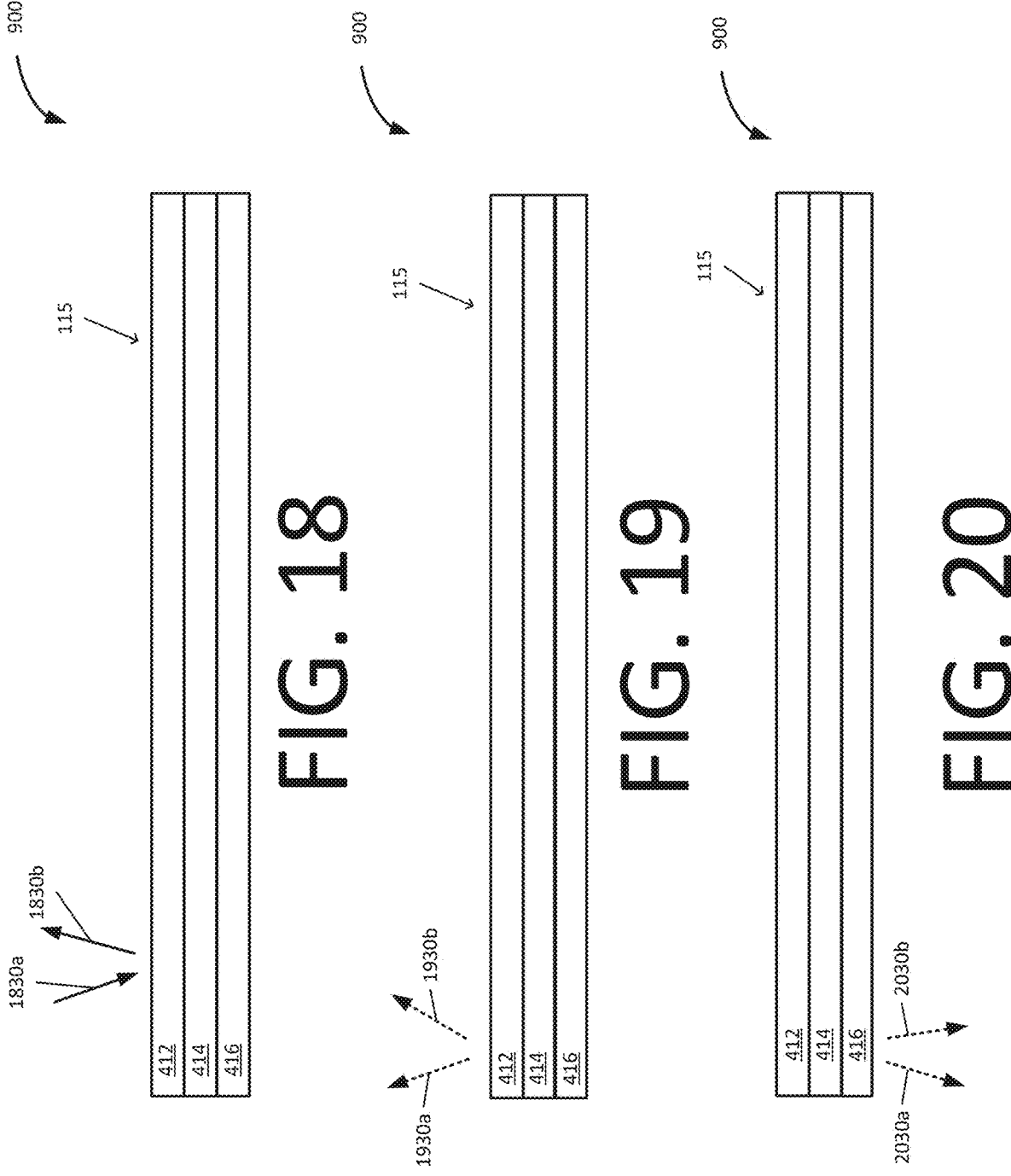
FIG. 18 is a block diagram of yet another exemplary way to stretch the pipe thread tape assembly, according to an embodiment.
FIG. 19 is a block diagram of still another exemplary way to stretch the pipe thread tape assembly, according to an embodiment.
FIG. 20 is a block diagram of yet another exemplary way to stretch the pipe thread tape assembly, according to an embodiment.

In some embodiments, as illustrated in FIG. 18, pipe thread tape assembly 900 may be stretched through a tearing or shearing motion (illustrated by arrows 1830a and 1830b, referred to collectively as 1830). For example, a user could pull/stretch the pipe thread tape assembly 900 downwards (shown by arrow 1830) and/or at a downward angle with one hand. At the same time, a user could pull/stretch the pipe thread tape assembly 900 upwards (shown by arrow 1830b) and/or at an upwards angle with a second hand. This can stretch 1830 the pipe thread tape assembly 900 and tear the liner 416 without tearing the tape 115 and the polyurethane film 412. In some instances, the tearing/stretching 1830 illustrated in FIG. 18 may still elongate the pipe thread tape assembly 900 lengthwise as the stretching/pulling 1830 may be at an angle and thus may still at least partially be in a lengthwise direction.

In some instances, the pipe thread tape assembly 900 may be stretched and/or pulled to a single angled direction. For example, a user may hold the pipe thread tape assembly 900 with one hand and may stretch the pipe thread tape assembly 900 with another hand. FIG. 19 illustrates some example upward stretching angles 1930a and 1930b that the pipe thread tape assembly 900 can optionally be stretched at. FIG. 20 illustrates some example downward stretching angles 2030a and 2030b that the pipe thread tape assembly 900 can optionally be stretched at. As discussed herein, stretching the pipe thread tape assembly 900 at an angle can result in enough lengthwise elongation to tear the liner 416.

In some embodiments, other ways to stretch the pipe thread tape assembly 900 and tear 1040 the liner 416 may be used. Further, although FIGS. 9-14 and FIGS. 16-20 illustrate stretching the pipe thread tape assembly 900 near end regions of the assembly 900, the pipe thread tape assembly 900 and the corresponding pipe thread tape 115 can be stretched from any region and/or area. For example, the pipe thread tape assembly 900 could be stretched at a middle region of the assembly 900. This could result in a tear 1040 more towards the middle region of the pipe thread tape assembly 900.

FIG. 21 illustrates example packaging 2100 for the pipe thread tape 115, according to an embodiment. In some embodiments, the pipe thread tape 115 can be provided in packaging 2100 in order to help contain and protect the pipe thread tape 115. The pipe thread tape 115 can still be coupled to the liner 416 when in the packaging 2100, in some instances. In certain embodiments, the pipe thread tape 115 is still coupled to both the liner 416 and an optional casting layer 418 when in packaging 2100. In some embodiments, the pipe thread tape 115 and corresponding pipe thread tape assembly (e.g., 400, 900) can be configured in roll form in the packaging 2100. The configured roll of pipe thread tape 115 can be, for example, either wrapped on to a center core of plastic or cardboard, or wound "core-less" and inserted into the packaging 2100. In either example, the packaging 2100 then holds the shape of the roll for user dispensing.

In some embodiments, the packaging 2100 can include a dispenser box 2150. When provided, the dispenser box 2150 can contain the pipe thread tape 115 and, in some instances, the pipe thread tape assembly (e.g., with the liner 416 and/or an optional casting layer 418). The dispenser box 2150 can include an opening 2170 (also referred to as a slot 2170) that the pipe thread tape 115 can be fed through. In some embodiments, the pipe thread tape 115 is still coupled to the paper liner 416 and is still part of a pipe thread tape assembly 400 when in the dispenser box 2150. In these instances, the pipe thread tape 115 and pipe thread tape assembly 400 can be positioned in the dispenser box 2150 such that the first side 810 of the pipe thread tape assembly 400 is facing upwards when exiting the opening 2170. This can result in the liner 416 being the uppermost layer of the pipe thread tape assembly 400 when exiting the opening 2170. In other embodiments, the polyurethane film 412 and the second side 720 of the pipe thread tape 115 can be facing upwards when exiting the opening 2170. Similarly, the optional casting layer 418 and the second side 820 of the pipe thread tape assembly 400 can be facing upwards when exiting the opening 2170, in certain embodiments.

FIG. 22 illustrates another example packaging 2200 for the pipe thread tape 115, according to an embodiment. In some embodiments, packaging 2200 can be packaging 2100 with additional features. These additional features can include a tab 2255 on the dispenser box 2150, in some instances. In an exemplary embodiment, the tab 2255 can be used to help easily dispense the pipe thread tape 115 and/or pipe thread tape assembly. For example, the dispenser box 2150 may contain a pipe thread tape assembly 400 with the pipe thread tape 115, the liner 416, and optionally the casting layer 418. In this example, the optional casting layer 418 can be fed through the tab 2255, as illustrated in FIG. 22. This can start separating the casting layer 418 from the polyurethane film 412 and the remaining pipe thread tape assembly. Further, in some instances, once the casting layer 418 is fed through the tab 2255, pulling on the casting layer 418 can both dispense the pipe thread tape 115 and continue separating the casting layer 418 from the pipe thread tape 115 and remaining pipe thread tape assembly.

As discussed herein, in some embodiments, the pipe thread tape 115 and corresponding pipe thread tape assembly (e.g., 400, 900) can be configured in roll form in the packaging 2100 and/or 2200. The roll form can be referred to herein as a pipe thread tape roll. The configured pipe thread tape roll can be, for example, either wrapped on to a center core of plastic or cardboard, or wound "core-less" and inserted into the packaging 2100 and/or 2200. In either example, the packaging 2100/2200 then holds the shape of the roll for user dispensing. FIGS. 23 and 24 illustrate example pipe thread tape rolls 2300 and 2400, respectively.

Specifically, FIG. 23 illustrates a pipe thread tape roll 2300 without a core and FIG. 24 illustrates a pipe thread tape roll 2400 with a core. As illustrated in FIG. 23, the pipe thread tape 115 and corresponding pipe thread tape assembly (e.g., 400, 900) can be configured in roll form by being wound around itself without a core. This is referred to herein as a core-less pipe thread tape roll 2300, as the pipe thread tape 115 is configured in a roll form without any sort of core. For a core-less pipe thread tape roll 2300, the packaging 2100/2200 can hold the shape of the roll 2300 for user dispensing without needing a core. For example, equipment such as a slitter takeup spline can have a pincher bar to grab a tail of the pipe thread tape 115 and corresponding pipe thread tape assembly (e.g., 400, 900) for winding. In this example, an unloading cup can hold the wound core-less pipe thread tape roll 2300 for unloading to help keep its shape. Then, in this example, the core-less pipe thread tape roll 2300 can be inserted into the packaging 2100/2200, thus allowing the packaging 2100/2200 to contain the roll 2300 and prevent the core-less pipe thread tape roll 2300 from unrolling/unwinding.

In some embodiments, as illustrated in FIG. 24, the pipe thread tape 115 and corresponding pipe thread tape assembly (e.g., 400, 900) can be configured into a roll using a core 2432. For example, the pipe thread tape 115 and corresponding pipe thread tape assembly (e.g., 400, 900) can be wound around a core 2432 in order to form the pipe thread tape roll 2400. The core 2432 can help the roll 2400 maintain its shape, in some instances. Once the pipe thread tape roll 2400 has been formed, the pipe thread tape roll 2400 can be inserted into the packaging 2100/2200. In some instances, the core 2432 and the packaging 2100/2200 can help contain the roll 2400 and prevent the roll 2400 from unrolling/unwinding.

FIG. 25 illustrates an example method 2500 of using pipe thread tape 115, according to an embodiment. Method 2500 can include operation 2510 of providing a pipe thread tape assembly in packaging. The pipe thread tape assembly can include at least pipe thread tape 115 (including polyurethane film 412 and adhesive 414) and a paper liner 416 coupled to the pipe thread tape 115 via the adhesive 414. The packaging can be packaging 2100, 2200, and/or any other type of packaging. In some embodiments, the pipe thread tape assembly can be configured in roll form within the packaging.

Method 2500 can also include operation 2520 to dispense the pipe thread tape assembly from the packaging. This can include the dispensing methods discussed herein in relation to FIGS. 21 and 22 and/or any other dispensing method. For example, in some instances, the pipe thread tape assembly in the packaging can include a casting layer 418 coupled to the polyurethane film 412 of the pipe thread tape 115. In these instances, dispensing the pipe thread tape from the packaging (operation 2520) can include separating the casting layer 418 from the pipe thread tape 115 optionally using a mechanism of the packaging, e.g., such that the paper liner 416 remains coupled to the pipe thread tape 115 after separating the casting layer 418 from the pipe thread tape 115. This can help continue to protect the adhesive 414 until just before the pipe thread tape 115 is applied to the piping component 110. In some embodiments, for example when the packaging is similar to packaging 2200, the packaging can include a dispenser box 2150. In some instances, the dispenser box 2150 can include a tab 2255 with the tab 2255 serving as the mechanism that separates the casting layer 418 from the pipe thread tape 115. Once the casting layer 418 is threaded through the tab 2255, separating the casting layer 418 from the pipe thread tape 115 can include pulling the casting layer 418 to guide additional length of the casting layer 418 through the tab 2255, thereby separating the additional length of the casting layer 418 from the pipe thread tape 115.

Method 2500 can include operation 2530 to separate the paper liner 416 from the pipe thread tape 115, thereby exposing the adhesive 414. In some embodiments, the paper liner 416 can be separated from the pipe thread tape 115 by stretching the pipe thread tape assembly lengthwise such that an entire width of the paper liner 416 tears without tearing the polyurethane film 412 of the pipe thread tape 115. This is discussed herein and depicted in relation to FIGS. 9-20.

Method 2500 can include operation 2540 to wrap the pipe thread tape 115 around external threads 112 at an end region of a piping component 110 (for example, as depicted in FIG. 1). For instance, the first side 710 of the pipe thread tape 115 can be wrapped against the end region of the piping component 110 with the adhesive 414 contacting the external threads 112. As discussed herein, the second side 720 of the pipe thread tape 115 can ultimately contact the internal threads 122 of the second piping component 120 once the piping components 110, 120 are attached and/or joined.

Advantages of embodiments disclosed herein include reducing and/or preventing health and environmental risks by using a PFAS-free pipe thread tape; providing a beneficial combination of elasticity, flexibility, strength, and durability through using a preferred polyurethane pipe thread tape; facilitating wrapping and preventing displacement of the pipe thread tape through the use of a light adhesive; effectively and easily separating the pipe thread tape from a liner; providing advantageous packaging embodiments; etc.

To facilitate an understanding of the subject matter described herein, many aspects are described in terms of sequences of actions. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the application. The use of any and all examples, or exemplary language (e.g., "such as") provided herein, is intended merely to better illustrate the subject matter and does not pose a limitation on the scope of the subject matter. The use of the term "based on" and other like phrases indicating a condition for bringing about a result, both in any claims and in the written description, is not intended to foreclose any other conditions that bring about that result. No language in the specification should be construed as indicating any non-claimed element as essential to the practice any claimed inventions.

In the present specification, anywhere the terms "comprising," "comprises," "including," or "includes" are used, those terms have their ordinary, open-ended meaning. In addition, where appropriate, the disclosure at each such location is to be understood to also disclose that it may, as an alternative, "consist entirely of" or "consist of."

Numeric ranges recited in this disclosure are to be understood to disclose and recite all the numbers defining the range and each integer within the defined range. Throughout this disclosure, various aspects are presented in range format. The descriptions in range format are merely for example, convenience, and/or brevity and should not be construed as an inflexible limitation on the scope of the disclosure. Moreover, the description of a range is to be understood as also specifically disclosing all possible sub-ranges, fractions, and individual numerical values within that range. For example, description of a range from 1 to 6 is to be considered as also specifically disclosing sub-ranges like from 1 to 3, from 1 to 4, from 1 to 5, from 2 to 4, from 2 to 6, from 3 to 6, etc., as well as each individual number within that range, i.e., 1, 2, 3, 4, 5, and 6, and relevant decimals and fractions, for example, 1.2, 3.8, 1½, and 4%. This applies regardless of the breadth of the range.

While specific examples have been provided above, it is understood that the present invention can be applied with a wide variety of materials, dimensions, properties, ranges, and other factors, depending on the application. For example, the ranges provided above are illustrative, but one of ordinary skill in the art would understand that these ranges may be varied, depending on the implementation.

As those skilled in the art will understand, a number of variations may be made in the disclosed embodiments, all without departing from the scope of this disclosure. It should be noted that although the features and elements are described in particular combinations, each feature or element can be used alone without other features and elements or in various combinations with or without other features and elements.

Thus, embodiments of pipe thread tape and using and/or installing pipe thread tape are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A method of installing pipe thread tape between a first piping component and a second piping component, the method comprising:

wrapping the pipe thread tape around external threads at an end region of the first piping component, resulting in a wrapped end region of the first piping component, wherein:

the pipe thread tape comprises a polyurethane film and an adhesive, such that the adhesive is at a first side of pipe thread tape, and the wrapped end region of the first piping component has the first side of the pipe thread tape against the end region of the first piping component such that the adhesive contacts the external threads, the polyurethane film having an elongation upon breaking between 5 inches and 24 inches, wherein the elongation upon breaking is measured as a difference between an original length of the polyurethane film and a final length of the polyurethane film at break, in combination with the adhesive having a peel strength between 125 g/25 mm and 225 g/25 mm; and attaching the wrapped end region of the first piping component to an internally threaded end region of the second piping component.

2. The method of claim 1, wherein the pipe thread tape is devoid of a base layer that comprises fabric, felt and/or nonwoven web.

3. The method of claim 1, wherein the adhesive is acrylic adhesive, and the peel strength is between 150 g/25 mm and 200 g/25 mm.

4. The method of claim 1, wherein the polyurethane film has a thickness between 20 microns and 75 microns.

5. The method of claim 1, wherein the pipe thread tape has a thickness between 0.03 mm and 0.10 mm.

6. The method of claim 1, wherein wrapping the pipe thread tape around the external threads comprises stretching the pipe thread tape into grooves of the external threads at the end region of the first piping component.

7. The method of claim 1, wherein once the wrapped end region of the first piping component is attached to the internally threaded end region of the second piping component, the pipe thread tape creates a seal between the external threads at the end region of the first piping component and the internally threaded end region of the second piping component.

8. The method of claim 1, wherein prior to wrapping the pipe thread tape around the external threads at the end region of the first piping component, the adhesive of the pipe thread tape is adhered removably to a paper liner, and the method further includes, prior to wrapping the pipe thread tape around the external threads at the end region of the first piping component, separating the pipe thread tape from the paper liner.

9. The method of claim 8, wherein the pipe thread tape has greater stretchiness than the paper liner.

10. The method of claim 8, wherein separating the length of the pipe thread tape from the paper liner includes stretching the pipe thread tape lengthwise such that an entire width of the paper liner tears without tearing the polyurethane film.

11. The method of claim 8, wherein the paper liner comprises a siliconized paper liner.

12. The method of claim 3, wherein the pipe thread tape has a single coat of the acrylic adhesive on the polyurethane film.

13. The method of claim 1, wherein the pipe thread tape has a width between 0.25 inch and 1.0 inch.

14. The method of claim 1, wherein the elongation upon breaking for the polyurethane film is between 10 inches and 24 inches.

15. The method of claim 14, wherein the polyurethane film has a breaking force of between 50 grams/millimeter width and 150 grams/millimeter width.

16. A method of using pipe thread tape, the method comprising:

separating pipe thread tape from a paper liner, the pipe thread tape comprising a polyurethane film and an adhesive, such that the adhesive is at a first side of pipe thread tape, the paper liner initially being coupled with the pipe thread tape via the adhesive, such that the coupled paper liner and pipe thread tape together form a pipe thread tape assembly, the pipe thread tape having greater stretchiness than the paper liner, wherein separating the pipe thread tape from the paper liner comprises:

stretching the pipe thread tape assembly to elongate it lengthwise such that an entire width of the paper liner tears without tearing the polyurethane film, thereby creating a loose torn end of the paper liner, and grabbing the loose torn end of the paper liner and pulling it away from the pipe thread tape to separate the paper liner from the pipe thread tape; and wrapping the pipe thread tape around external threads at an end region of a piping component, such that the first side of the pipe thread tape is against the end region of the piping component with the adhesive contacting the external threads.

17. The method of claim 16, wherein the adhesive has a peel strength between 125 g/25 mm and 225 g/25 mm.

18. The method of claim 17, wherein the adhesive is acrylic adhesive, and the peel strength is between 150 g/25 mm and 200 g/25 mm.

19. The method of claim 16, wherein the polyurethane film has an elongation upon breaking between 5 inches and 24 inches, wherein the elongation upon breaking is measured as a difference between an original length of the polyurethane film and a final length of the polyurethane film at break.

20. The method of claim 16, wherein the paper liner is a siliconized paper liner.

21. The method of claim 16, wherein the adhesive is a single-coat acrylic adhesive.

22. The method of claim 16, wherein the polyurethane film has a thickness between 20 microns and 75 microns.

23. The method of claim 16, wherein the pipe thread tape assembly further comprises a polyethylene casting layer, the polyethylene casting layer initially being coupled to a second side of the polyurethane film, and the adhesive being on a first side of the polyurethane film, the first and second sides of the polyurethane film being opposed sides, the method further comprising removing the polyethylene casting layer from the polyurethane film prior to wrapping the pipe thread tape around the external threads at the end region of the piping component.

24. The method of claim 16, wherein the pipe thread tape has a width between 0.25 inch and 1.0 inch.

25. A method of using pipe thread tape, the method comprising:

providing a pipe thread tape assembly in packaging, the pipe thread tape assembly comprising:

a pipe thread tape, the pipe thread tape comprising a polyurethane film and an adhesive, such that the adhesive is at a first side of pipe thread tape, and a paper liner coupled to the pipe thread tape via the adhesive, dispensing the pipe thread tape assembly from the packaging;

separating the paper liner from the pipe thread tape, thereby exposing the adhesive, wherein separating the pipe thread tape from the paper liner comprises:

stretching the pipe thread tape assembly lengthwise such that an entire width of the paper liner tears without tearing the polyurethane film; and wrapping the pipe thread tape around external threads at an end region of a piping component, such that the first side of the pipe thread tape is against the end region of the piping component with the adhesive contacting the external threads.

26. The method of claim 25, wherein:

the pipe thread tape assembly further comprises a casting layer coupled to the polyurethane film; and dispensing the pipe thread tape from the packaging comprises:

separating the casting layer from the pipe thread tape using a mechanism of the packaging, such that the paper liner remains coupled to the pipe thread tape after separating the casting layer from the pipe thread tape.

27. The method of claim 26, wherein:

the packaging comprises a dispenser box;

the mechanism comprises a tab; and once the casting layer is threaded through the tab, separating the casting layer from the pipe thread tape comprises:

pulling the casting layer to guide additional length of the casting layer through the tab, thereby separating the additional length of the casting layer from the pipe thread tape.

28. The method of claim 25, wherein the pipe thread tape assembly is configured in roll form in the packaging, resulting in a pipe thread tape roll.

29. The method of claim 28, wherein the pipe thread tape roll is a core-less roll.

30. The method of claim 28, wherein the pipe thread tape roll comprises a core and the pipe thread tape assembly wound around the core.

* * * * *